United States Patent [19]

Friend et al.

[11] 4,442,502
[45] Apr. 10, 1984

[54] DIGITAL INFORMATION SWITCHING SYSTEM

[75] Inventors: George E. Friend, Dallas; John D. Meyers, Plano; Steve Van Dyke, Dallas; James R. Carreker, San Antonio, all of Tex.

[73] Assignee: Datapoint Corporation, San Antonio, Tex.

[21] Appl. No.: 248,821

[22] Filed: Mar. 3, 1981

[51] Int. Cl.³ .................... G06F 11/20; G06F 3/04
[52] U.S. Cl. .................................. 364/900; 370/58; 370/67; 371/9; 371/10
[58] Field of Search ... 364/200 MS File, 900 MS File; 370/58, 67; 371/9, 10

[56] References Cited

U.S. PATENT DOCUMENTS 4,145,734 3/1979 Bienvenu ..................... 364/200
4,322,843 3/1982 Beuscher et al. ............. 370/58

Primary Examiner—Raulfe B. Zache
Attorney, Agent, or Firm—Antonelli, Terry & Wands

[57] ABSTRACT

A digital information switching system features modular design with dispersed processing in which data is switched locally in one of a plurality of remote switching units for connection between local terminals, and data to be exchanged between terminals connected to different remote switching units is switched in a central switching unit, which is connected to the remote switching units by way of interswitch links. Both the central switching unit and the remote switching units are of the same general configuration being individually processor controlled. Reliability of each unit in the system is enhanced by diagnostic and maintenance features including provision of redundant devices in each unit, detection of device failures, automatic replacement of failed devices with redundant devices and communication of the failure to a remote service center.

29 Claims, 17 Drawing Figures

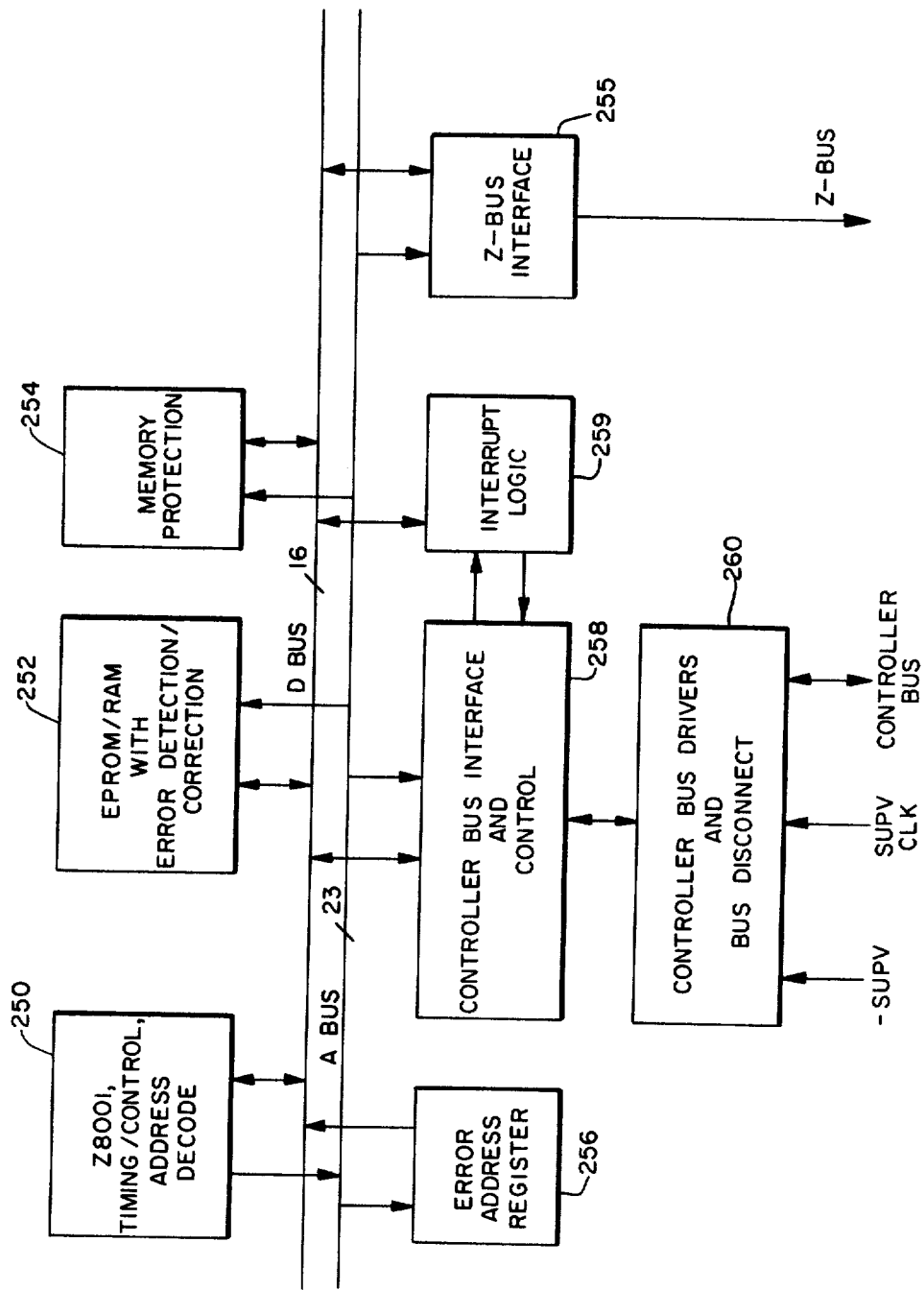

DIGITAL INFORMATION SWITCHING SYSTEM

BACKGROUND OF THE INVENTION

The present invention is directed in general to communication systems, and more particularly, to a digital electronic communication management and information switching system which operates under dispersed microprocessor control to manage the interconnection, usage, record keeping and maintenance of various types of conventional and specialized voice, data and facsimile terminals.

During the past decade, the emphasis in electronic system design has been on centralized control using computers of various size, degree of sophistication and complexity. However, with the implementation and use of such systems over a period of time, concern has been expressed over various inherent disadvantages of the centralized processing system, including lack of flexibility, obsolescence, and serious maintenance problems which have literally rendered such systems totally unusable in response to individual device failures within the system. On the one hand, complaints have been heard that a particular system was not capable of handling certain business office problems, having been designed for general use in an effort to provide a universal product. On the other hand, even for those fortunate enough to obtain a system suitable for their specific needs, the problem of obsolescence presented itself only too quickly, especially in conjunction with systems that could not be expanded. Finally, the problem of downtime in central processing systems presented the ultimate frustration since malfunction in the system generally resulted in the entire system becoming disabled, therey rendering it totally useless until repairs could be made. This interference with business was more than just an inconvenience to the businessman; it represented an unacceptable limitation on his ability to adequately serve his customers and clients and resulted in a serious waste of manpower and other resources.

In an effort to overcome the above-mentioned disadvantages in centralized processing systems, designers began to turn to modular concepts of system design, and with the significant advances in microprocessor development which brought a drastic reduction in the cost of microprocessor manufacture, distributed processing within a system began to replace the centralized processing of prior years.

In additon, new types of systems began to be developed. In the communication fields, the emphasis has shifted toward digital systems. Thus, in the telephone industry, digital central office and private branch exchange systems have been developed and made available for use by the public. At the same time, new data communication systems involving the transmission of all types of data and information in digital form have been developed. Systems have been developed for word processing as well as data processing and electronic message functions in an effort to provide a more complete scope of services for the standard business office or large corporation. These systems include not only electronic private branch exchanges, but also shared resource word processing and data processing systems; however, there has been a tendency to design such systems independently of one another, i.e., word processing systems, data processing systems and telephone exchanges which are self-contained and designed specifically for those respective functions. Thus, the business office typically may have a number of local networks and other computer resources providing data, text, and messages all flowing through or residing in respective systems in the form of a high volume of digitized information that must be accessed, sent, processed, managed and manipulated, as well as verbal information that needs to be communicated throughout the system. Such a situation calls for a communication hub or switching system into which the information can flow, be it data, text, voice or messages and be switched to its destination while simultaneously recording information on each transaction.

BRIEF DESCRIPTION OF THE INVENTION

A system is provided in accordance with the present invention in the form of a family of information switching exchanges for effecting the connections from person to person, from person to computer, and from computer to computer within the business office. In one aspect, the system of the present invention looks like an electronic PABX performing all of the voice functions normally associated with an electronic private automatic branch exchange. However, in another aspect this system integrates with terminals and with local networks, bringing word processing, electronic message services and data processing into the office network as communities of interest. Thus, the system enhances existing dispersed data processing by using its power and speed to permit easy access to processing power through any compatible terminal and provides detailed reporting on all information transactions, and ultimately, related costs, such as materials and labor, giving business organizations a degree of control and systems knowledge never previously available.

In accordance with the present invention, there is provided a new generation of communication system which combines the features of a data information and processing system with that of a telephone private branch exchange in an overall digital system having distributed processing, flexibility in size and automatic maintenance features. The system of the present invention provides as primary components a switching/process control subsystem consisting of a central switching unit and a plurality of remote switching units, and a data management system providing a full range of word processing and data communication and processing features. The central switching unit performs the central switching control, call processing and external communication functions for the switching/process control subsystem, with the local switching and interface to the system by telephone instruments and terminals being accomplished by the remote switching units. Information which is destined for an area outside that of the original remote switching unit, such as another remote switching unit, remote data base or terminal, public or private carrier, is routed from the originating remote switching unit through the central switching unit. The system provides for dispersed switching architecture which allows modular, dynamic growth in terms of size and available features, and provides the user with the cost advantage of having to purchase only that switching power which is presently needed. Dispersed switching, like dispersed processing, has the additional inherent benefit of reducing the workload of the central switching unit by performing much of the local switching work at the remote switching unit level.

The data management system, which is connected to the central switching unit by a direct coaxial cable link, typically consists of a standard processor, printer and disc, which handles an assortment of administrative chores for the central switching unit including the collecting of data on system usage as well as the assignment of class of service definitions to individual stations, rearrangement of extension numbers, or the implementation of a customer least-cost routing table for the system. However, one of the major features of the data management system insofar as its integration with the telephone switching function of the system is concerned relates to the detailed reporting on costing, usage, and traffic provided thereby. Thus, the system provides a total integration of services relating to voice, data and message services within a shared resource, processor dispersed system.

Because of its modular design and dispersed switching architecture, the system of the present invention can easily handle growth and expandability. As a user's requirements increase, each remote switching unit can be expanded in pace with that growth and additional remote switching units can be added where larger increases in system size are required. Telephone instruments can be added to the central switching unit quickly since the data management system facilitates real-time, dynamic means of adding, changing, or moving extension numbers, and the actual physical placement of terminals is transparent to the system, which allows them also to be changed or added as the user sees fit. Features and functions are also easy to add and change, whether they are telephone instrument features, such as conference calling, or system features, such as electronic message services. Both can be accomplished by change to system table entries or the addition of software modules with little or no change required in the system hardware.

In addition to the dispersed processing feature of the system of the present invention, unique maintenance features minimize risk of system failure. Self-diagnostic maintenance procedures in each remote switching unit and central switching unit continually monitor the system, and if a problem occurs, the faulty circuit board is isolated, electrically disconnected and its spare is immediately enabled in an automatic manner within the system without outside control. This occurs without interruption to calls in progress, even if the failure is in a critical area, such as one of the computer microprocessors, memories or switching matrix in the system. A diagnostic report is then automatically forwarded to a central service center at which a message is printed out identifying the customer site, the type of product, which cabinet, which card cage, which card slot within that cage, what type of circuit board and the revision level of the board that failed. It is therefore possible to dispatch a service representative in response to such an automatic communication with the correct replacement equipment to be installed while the system is in full operation.

It is a principal object of the present invention to provide a digital information switching system which can fully integrate the functions of data processing, word processing, electronic message systems and voice, incorporating the principles of modular design, distributed processing and automatic diagnostic and maintenance features in a single digital information system.

It is another object of the present invention to provide a digital information switching system which utilizes dispersed architecture, dispersed data processing and local switching to permit system design for individual user needs and the ability to expand in any aspect of the system in accordance with the user's future needs and requirements.

It is still another object of the present invention to provide a digital information switching system having a high degree of reliability through the use of self-diagnostic features and the provision of individual redundant components, rather than redundant systems, to ensure continuous system operation without interruption by component failures and automatic reporting of faults to ensure prompt maintenance and service of the system.

Another object of the present invention is to provide a digital information switching system that can integrate voice, data, facsimile, electronic and voice message services, graphics, word processing and coaxial-cable based local area data networks.

It is still a further object of the present invention to provide a digital information switching system having dispersed switching architecture which provides modular, dynamic growth in terms of both system size and number and type of user functions and features.

These and other objects, features and advantages of the present invention will become more apparent from the following detailed description, when taken in conjunction with the accompanying drawings, in conjunction with an exemplary embodiment of a digital information switching system.

BRIEF DESCRIPTION OF THE DRAWINGS

FIG. 5 is a schematic block diagram of a system or MMI processor of the type used in the central switching unit and remote switching unit;

DETAILED DESCRIPTION OF A PREFERRED EMBODIMENT

The present invention provides an all-digital switching system which treats all signals to be switched as digital data. Signals, such as telephone conversations, which exist in the outside world in analog form are changed to digital quantities at the point of connection to the system, and carried throughout as digital data. Signals from digital data terminals are brought into the system, switched and transmitted without conversion to analog form. Control information, from voice lines, data circuits and process control system connections, is also brought directly into the system if originally digital in form, or converted to digital form at the system interface and processed in that form internally.

Figure 1:
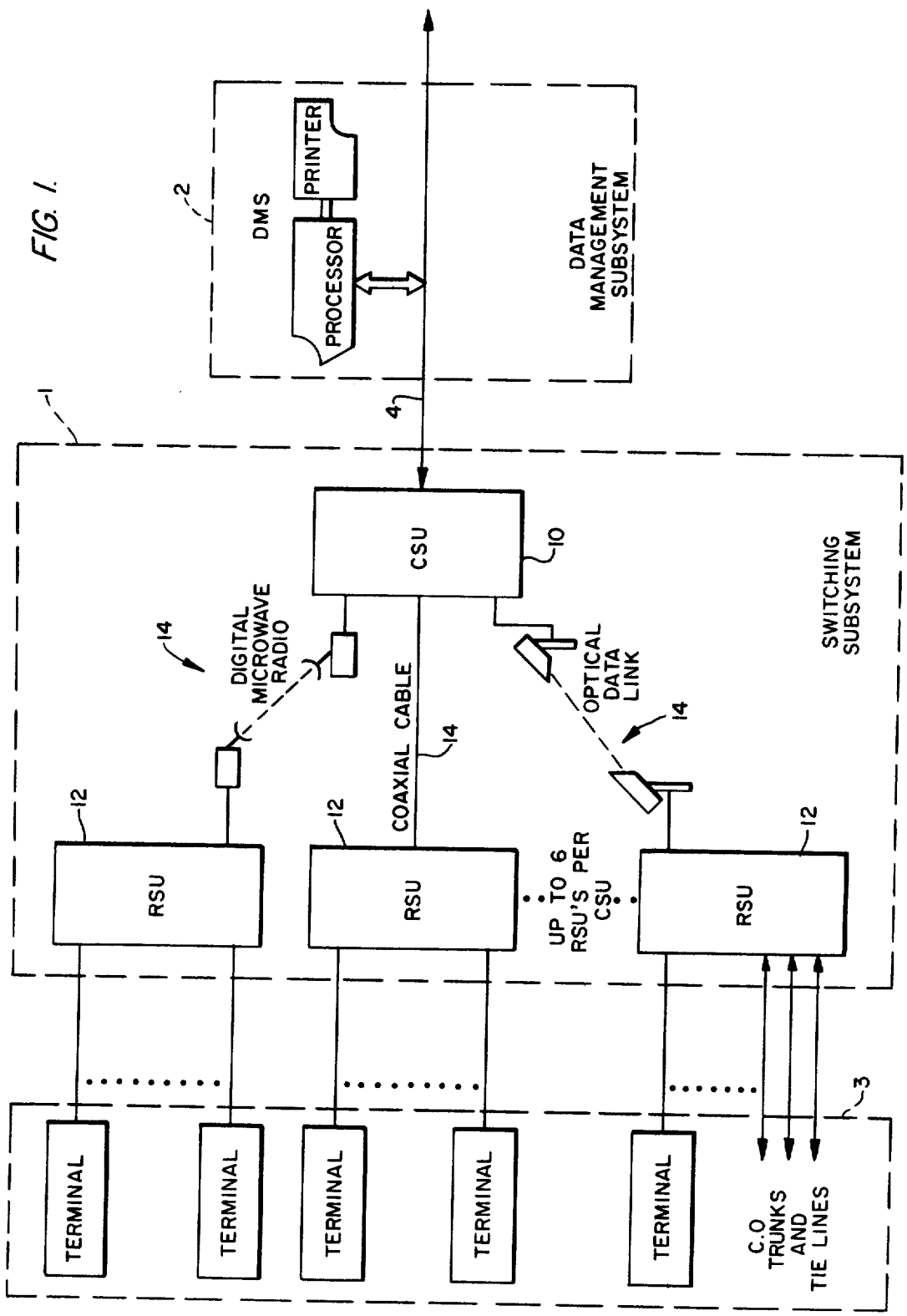
FIG. 1 is a schematic block diagram of a digital information switching system in accordance with the present invention.

As shown in FIG. 1, the system is divided into three basic parts: a switching subsystem 1, a data management subsystem 2 and a set of terminals 3. The switching subsystem 1 performs necessary format conversion of information signals exchanged between the terminals 3, senses and produces control signals, such as dial pulses for the terminals 3, and routes the information signals, i.e., switches the call or connection. The data management subsystem 2, which is connected to the switching subsystem 1 via an interprocessor bus 4, stores data used to direct the switching subsystem 1 and stores records produced by operation of the system, such as call billing information. Data required to configure the system to a particular customer's requirements is entered and updated using terminals and software provided in the data management subsystem 2. While in its broadest sense the present invention provides for the interconnection of any known data management subsystem to the switching subsystem 1 via an interprocessor bus 4, one particularly-suitable system for this purpose is the Attached Resource Computer (ARC) system, manufactured and sold by the assignee of the present invention.

The system illustrated in FIG. 1 controls and interconnects a variety of traditional terminals 3, such as rotary or pushbutton telephones, as well as contemporary terminals, such as electronic telephone sets and directly-connected digital data terminals. The system may also interact directly with the terminal or provide a path between two or more compatible terminals using addressing and connection information supplied by the terminals in accordance with customer's data base as stored in the data management subsystem 2.

Switching of voice and/or data information is provided by the switching subsystem 1, which is formed by a combination of distinct units including a central switching unit 10 and one or more remote switching units 12. The central switching unit 10 provides interconnection among multiple remote switching units 12, controlling the set up and progress of all connections through the switching subsystem 1. The central switching unit 10 is also the connection point for the data management subsystem 2 via the interprocessor bus 4. Connections to the central switching unit 10 from each remote switching unit 12 are effected via one or more interswitch links (ISL) 14, which may take the form of coaxial cable, digital microwave radio link, optical data link, or a standard T1 PCM span link, for example.

Switching in the central switching unit 10 of an information stream consists of establishing a path in time between a time slot in an incoming interswitch link 14 and a selected time slot in an outgoing interswitch link 14. This is accomplished by a single-stage, strictly non-blocking time slot interchange network, which ensures that a path is always available through the switch. In a similar manner, switching is also provided in each of the remote switching units between terminal units or devices connected thereto, and this switching is again accomplished by a single-stage, strictly non-blocking time slot interchange network in the remote switching unit 12 itself. Sensing and control for the terminals 3 is performed over a separate digital internal control path common to all terminal units or devices and which extends to the central switching unit 10 over the interswitch links 14.

Directory information including names and corresponding directory numbers, connection information including directory numbers versus physical port locations, class of service data, and all data related to record-keeping are supplied from the data management subsystem 2 and maintained in the central switching unit 10 of the switching subsystem 1. Each central switching unit 10 can connect to sixty remote switching unit connections, and, with each remote switching unit 12 being connected to the central switching unit 10 via one or more interswitch links 14 and each remote switching unit supporting up to 384 terminals, the overall system as seen in FIG. 1 could serve as many as 23,800 terminals overall. On the other hand a system of as few as 200 terminals may also be provided. As will be described in greater detail herein, the concentration of the ports to the interswitch links 14 in accordance with the present invention is variable depending on the configuration of the remote switching units 12, making possible completely non-blocking switching to the central switching unit 10 under various switching configurations.

The terminals 3 which may be attached to the system are of two basic types: user terminals and system terminals. User terminals interact directly with the user and his equipment, such as data processing or facsimile machines, while system terminals connect the system to public and private networks, or enable attendant and maintenance technician control of the system. The system supports various types of user terminals, including conventional single line station sets, conventional multibutton key sets, electronic telephones and various standard data units which allow direct input of digital data and associated control information at rates of up to 56,000 bits per second. Terminals to connect the system to all common central office and tie trunks are also provided.

As system terminals, there may be provided attendant consoles, a maintenance terminal and a remote diagnostic center. These terminals interface with the switching subsystem 1 in the same manner as the user terminals. The particular terminal which provides digital data to the system is transparent at the interface to the switching subsystem 1, the system receiving data from any of these terminals 3 without regard to the type of terminal involved.

Figure 2:
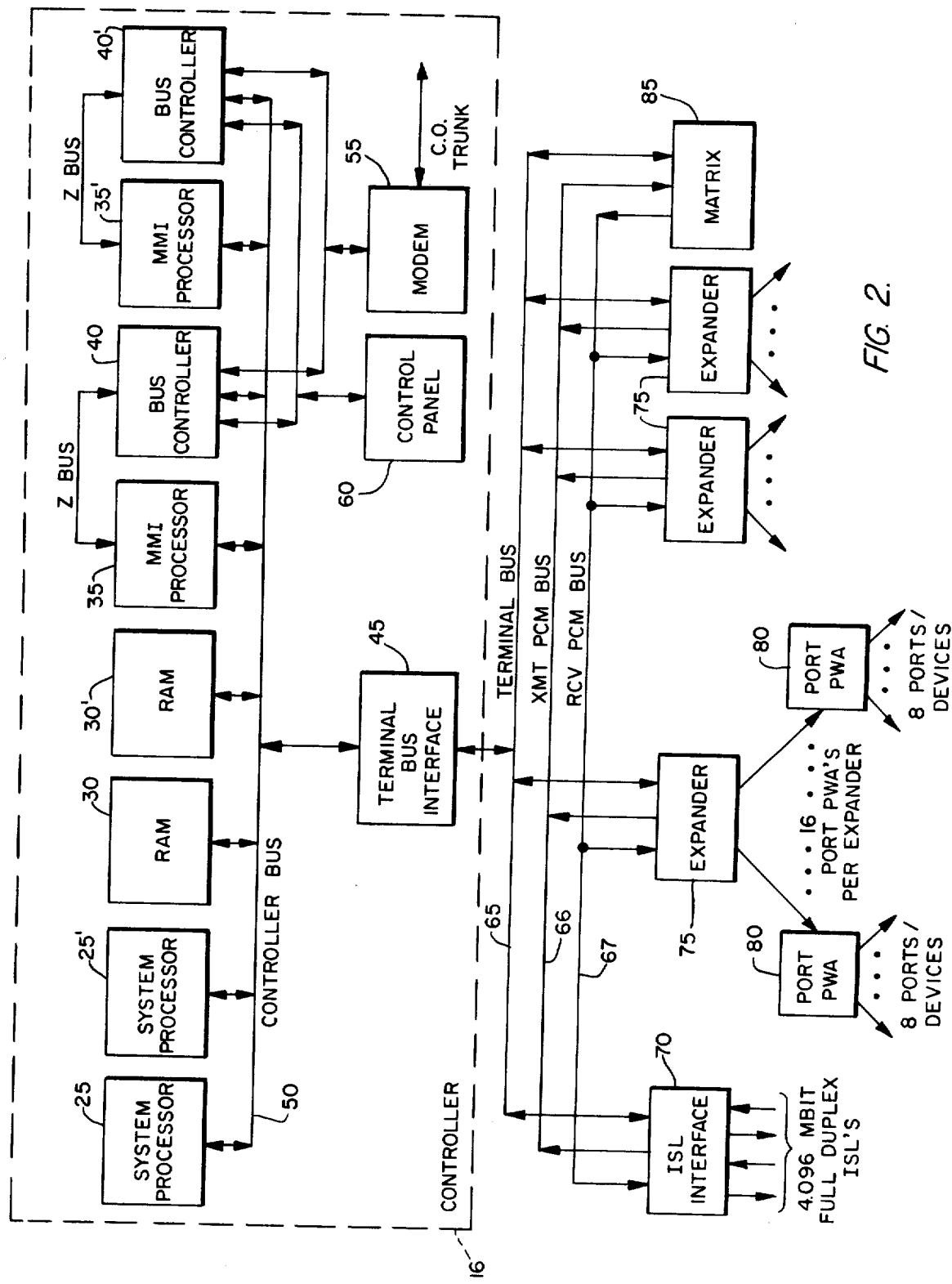
FIG. 2 is a schematic block diagram of a remote switching unit as embodied in the system of FIG. 1.

FIG. 2 is a more detailed block diagram of a typical remote switching unit 12 as provided in the system of FIG. 1. The remote switching unit 12 provides low level interface, processing and local switching for the connected stations, trunks, electronic instruments, attendant consoles and common control electronics connected as terminals thereto. Conversion between analog voice signals and industry standard digital format and concentration of the devices in accordance with the time slots provided by the interswitch links 14 are also accomplished in the remote switching unit 12.

The heart of the remote switching unit 12 is formed by a controller 16 which comprises one or more system processors 25, random access memory units 30, maintenance management interface (MMI) processors 35, bus controllers 40, terminal bus interfaces 45 and a bidirectional controller bus 50, which interconnects these elements, providing for exchange of data, address and control signals therebetween. The controller 16 additionally includes a modem 55 connected to the bus controllers 40 for effecting automatic communication relating to the detection of faults within the system to a remotely-located central service area via a central office trunk, and a control panel 60, which is also connected to the bus controllers 40, is provided to effect interface by maintenance personnel with the system.

The controller 16 communicates with a terminal bus 65 via the terminal bus interface 45 and it is over Z terminal bus 65 which sensing and control data messages to and from the system processors 25 and terminals 3 are carried. Connected to the terminal bus 65 are one or more ISL interfaces 70, expanders 75 and switching matrices 85, the expanders 75 in turn each being connected to a plurality of port interface circuits having outputs extending to a plurality of ports associated with the terminals 3. In addition to the terminal bus 65, a transmit PCM bus 66 and a receive PCM bus 67 interconnect the matrix 85 with the expanders 75 and the ISL interface 70.

Figure 3:
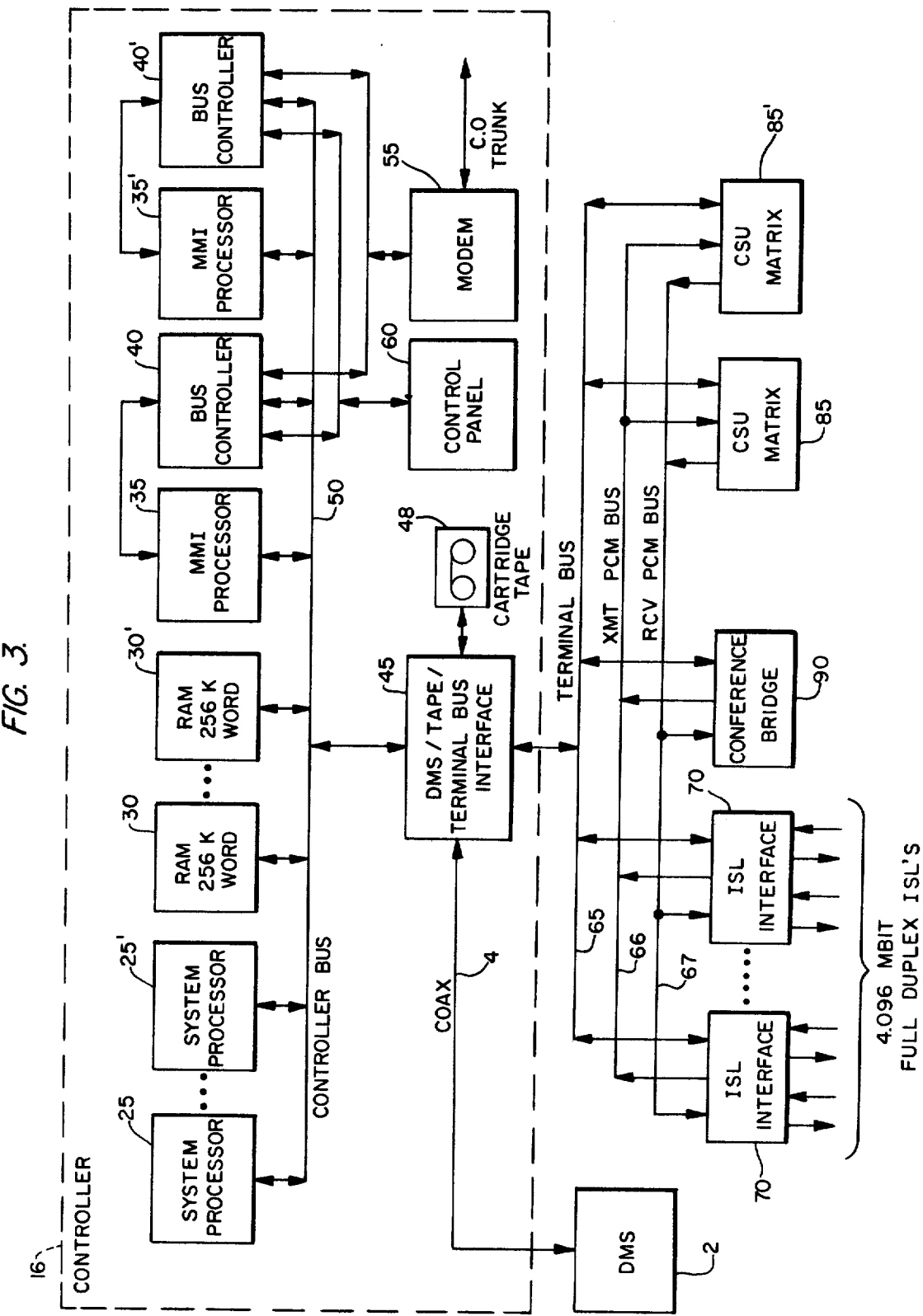
FIG. 3 is a schematic block diagram of the central switching unit as provided in the system of FIG. 1.

As seen in FIG. 3, the central switching unit 10 is virtually identical to the remote switching unit 12. One difference between these units resides in the fact no expanders 75 are provided in the central switching unit 10; instead, additional ISL interface circuits 70 (up to thirty) and a conference bridge 90 are connected to the buses 65, 66 and 67. In addition, the terminal bus interface 45 in the controller 16 provides for connection to the data management subsystem 2 via the interprocessor bus 4, as well as to a cartridge tape unit 48, which provides local non-volatile storage of the on-line program and data base for the central switching unit 10. Otherwise, the units 10 and 12 are the same. Thus, to facilitate the description of the present invention, only a detailed description of a remote switching unit 12 will be presented herein, it being understood that such description is also applicable to the components and function of the central switching unit 10.

The heart of the controller 16 as provided in any of the switching units 10 and 12 is the multiconductor controller bus 50 which provides for interconnection of the various devices which make up the controller, such as the system processor 25, memory 30, MMI processor 35 and the terminal bus interface 45 by which the controller bus interfaces with the terminal bus 65. The operation of the controller bus 50 is based upon a concept of physical and logical identification, with each card edge connector position being provided with a unique 5 bit card slot address via etch patterns which are unique to that position. The logical address of any device is a dynamic value assigned by the MMI processor 35 at system initialization/configuration or as a result of reconfiguration caused by failure of some device. This value is stored in a logical address register within the device and is used by the device for all normal communication with other devices on the bus 50. However, the physical addresses permit direct addressing of the bus slot portions, facilitating the assigning of logical addresses and the selective replacement of active devices on the bus in response to failures.

Communication between devices connected to the controller bus 50 is on a request/grant basis, under supervision and control of the bus controller 40. Requests for bus access are arbitrated by the bus controller 40 and access is granted for a single bus operation to a processor 25 or other device which can request bus access for a data transfer to or from a common memory location, an interprocessor interrupt or other transfer of data, control or status information between devices on the bus 50. Operation of the bus 50 is synchronous at a 4 MHz rate, and all bus signals change only at bus clock cycle boundaries, providing a minimum timing element of 250 nanoseconds, which is referred to hereinafter as a "bus cycle".

Figures 4, 4A:
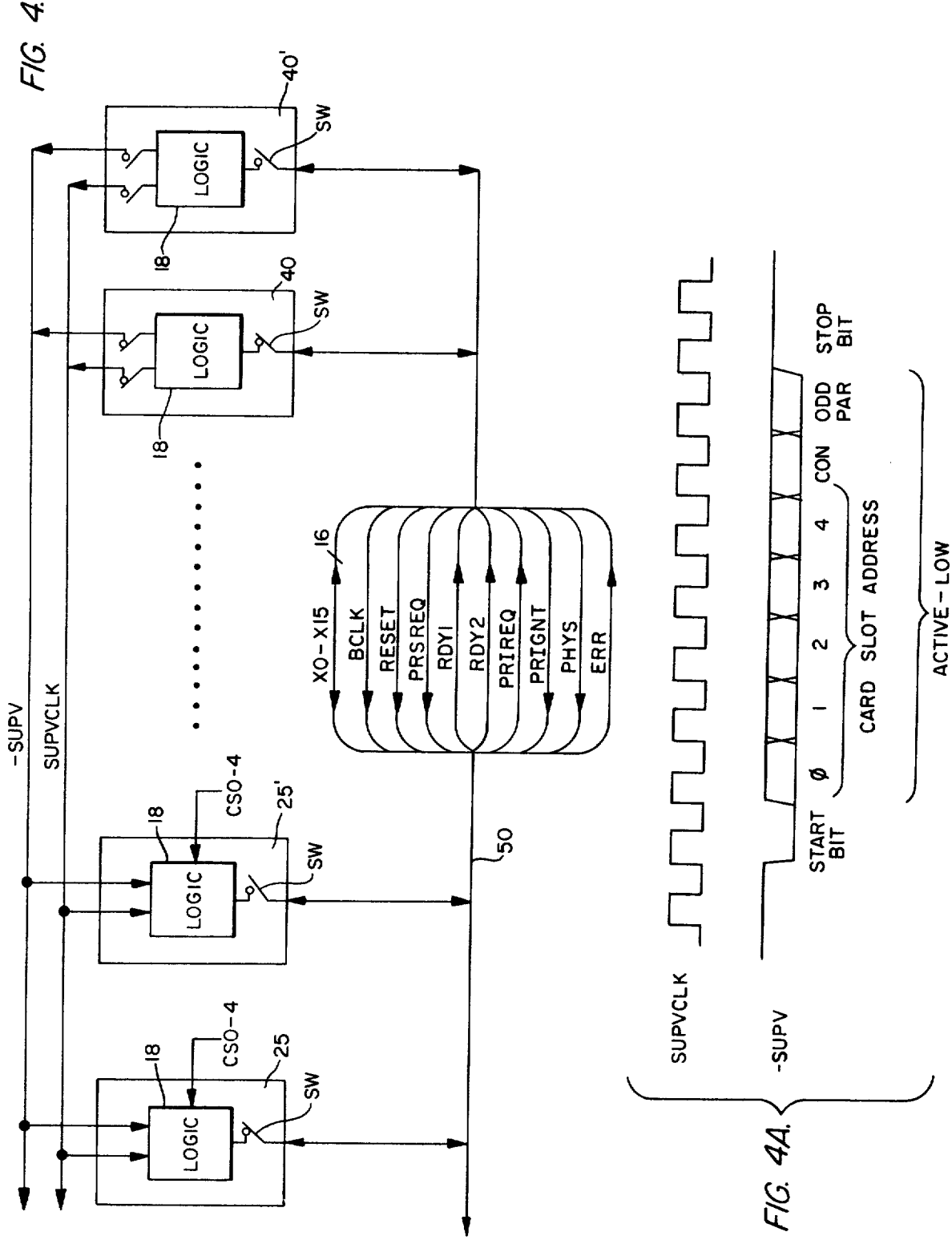
FIG. 4 is a schematic diagram of the controller bus arrangement as provided in both the remote switching unit and central switching unit in the system of FIG. 1.
FIG. 4A is a waveform diagram showing signals which appear in the control bus arrangement of FIG. 4.

As seen in FIG. 4, the controller bus 50 is made up of the following signal lines:

On the line BCLK, a 4 MHz clock signal is applied by the bus controller 40 to synchronize all operations on the bus. All transitions of other bus signals are in synchronization with the positive edges of the BCLK signal.

The lines X0 through X15 represent sixteen bit bidirectional data, address and control bus lines. These lines are active-high except when they are used as bus request lines, in which case they appear active-low.

The RESET line carries a reset signal generated by the bus controller 40 under control of the MMI processor 35 to initialize the bus interface logic on all devices and to force all devices to the receive mode at that time.

The PRSREQ line carries a "present request" signal generated by the bus controller 40. While the PRSREQ line is active (low), each device desiring access to the bus presents a low level on the single X0 through X15 line to which it is connected. The number of the X line to which a device's bus request signal is connected corresponds to the physical address of that device on the controller bus 50.

Two ready lines RDY1 and RDY2 are provided in the bus 50 to carry "ready" signals generated by the device accessed during a bus operation to indicate that it is presenting valid data (read) or has accepted presented data (write). If the operation is of a type which requires indication of ready, the bus controller 40 monitors the RDY lines and terminates a bus operation if both have not been activated (low level) within a predetermined time after the operation was initiated. Two ready lines are used so that two random access memories 30 and 30' which have been assigned the same logical address may operate in a "shadow write" mode where both memories store the same data during a write operation. The two ready lines provide the basis for the two memory circuits to independently indicate the "ready" condition under those circumstances where they are operating on inherently-different internal cycle times or where one of these memory circuits may be refreshing when the write operation occurs thus requiring more time than the other memory circuit. In either case, the write operation cannot be terminated until both memory circuits have taken the data being presented.

The PRIREQ line is a priority bus request line for use by high data rate devices on a priority basis, providing the ability of a data device to override the standard contention arbitration scheme used in the controller 16.

The PRIGNT line is a priority bus grant line carrying a signal generated by the bus controller 40 to the device requesting priority access. Use of the PRIREQ and PRIGNT lines allow bus access to immediately follow a bus operation in process without expending the bus request/grant time following the current operation.

The PHYS line indicates a physical address being carried by the bus as opposed to a logical address. Only the bus controller 40 is capable of driving this line so that except for the MMI processor 35 operating via the bus controller 40, no other processor device connected to the controller bus 50 can indicate use of physical addressing by taking this line to the active state (low level).

The ERR line in the controller bus 50 indicates that an uncorrectable read error in one of the random access memory circuits 30 has occurred during a given read operation. The memory circuit 30 forming the read operation during that operation should take this line low if the uncorrectable error is detected. The ERR line is activated during the bus cycle in which the RDY lines are activated, and the bus operation terminates after the ready cycle in the normal fashion as though the error did not occur. It is the responsibility of the accessing processor or device and the MMI processor 35 to take action on this error.

The CS0 through CS4 lines in the bus 50 provide the physical address to each of the devices connected to the bus. Some or all of these signals are grounded in a pattern unique to each card slot and thereby form a five bit physical address. Each device compares this value with the card slot address information used in the physical address mode, a 0 being represented by a grounded pin and a 1 being represented by an open pin, for example.

As seen in FIG. 4, in addition to the lines of the controller bus 50 interconnecting the various devices in the controller 16, a pair of special lines SUPV and SUPVCLK extend from each bus controller 40 to each of the devices connected to the controller bus 50. The line SUPV is a serial data line common to all card slots, and carries both address and control information to the devices connected to the controller bus 50 for purposes of controlling connection of those devices or disconnection thereof with respect to the lines of the controller bus 50. This communication line is used exclusively by the MMI processor 35 to control the connect relays 137 which serve to connect to disconnect each of the devices to the controller bus 50. The data bits carried by the line SUPV are synchronous with positive transitions of the clock signal carried by the line SUPVCLK. As seen in FIG. 4A, the character format of the serial data on the line SUPV includes one start bit, five card slot address bits, a connect/disconnect bit, one odd parity bit covering the address and connect bits and a stop bit. If the connect bit is a "1" (low level) a connect command is indicated; whereas, if the connect bit is a "0" a disconnect command is indicated.

While various known arbitration schemes are possible for providing access to the controller bus 50 by the various devices associated therewith, the following contention arbitration scheme may be utilized in the system described herein by way of example. Sixteen of the card slots on the bus 50 in the controller 16 have a bus request edge connector pin connected to a unique X(n) line in the controller bus 50. For example, the bus request pin on card slot 3 is connected to line X3, the bus request pin on card slot 4 is connected to line X4, and so forth. This connection is in addition to the normal bus connection of the X lines to the card slot for addressing purposes. Bus request lines are only connected to card slots whose address is 0–15.

The bus controller 40 solicits bus requests from devices on the bus 50 by taking the PRSREQ line low. During this bus request cycle, each device desiring access to the bus 50 takes its bus request line low, causing a unique X(n) line to go low for each device requesting access. Since a direct correspondence exists between the physical card slot and the bit position in which the device in that card slot presents its bus request, the bus controller 40 is able to unambiguously identify which devices are presenting bus requests.

At the end of the request cycle, the bus requests are stored in respective latches by the bus controller 40, and the bus request which was received on the lowest number X line is selected for service during the next bus operation. After that bus operation is complete, the request latch for that device which was serviced is cleared and the bus controller 40 then selects the next lowest numbered X line remaining, without activating the PRSREQ again. All requests which were received during the first activation or PRSREQ will be serviced in this manner until all request latches have been cleared. The bus controller 40 will then activate PRSREQ again to initiate a new request cycle.

Physical addressing can only be invoked by the MMI processor 35/bus controller 40 and is used for bus control and diagnostic purposes. This addesss mode is invoked by the bus controller 40 by activating the PHYS line, subsequent to which all devices connected to the controller bus 50 are automatically placed in the receive mode and interpret address information contained on the X0–X15 lines as a physical (card slot) address.

The use of the PRIREQ/PRIGNT lines of the bus 50 provides even faster bus access for a device with urgent, nondeferable bus requirements. The priority device uses the PRIREQ line as its bus request line instead of one of the X lines as do other devices. If the PRIREQ line is activated during a normal bus request cycle, the bus controller 40 gives the device priority over other devices and returns PRIGNT during the next cycle and does not activate the PHYS line as it normally would do for a grant cycle. Since PHYS is inactive, other devices do not interpret the priority grant cycle as a normal grant cycle; instead, while the PRIGNT is low, the priority device places its function and address information on the bus 50. Thus, the normal arbitrated bus grant cycle is deleted from the priority device's bus access.

Since the controller bus 50 is not used for request/grant by the priority device, it can request bus access during a bus operation in process by activating the PRIREQ line. The bus controller 40 returns PRIGNT in the first bus cycle following completion of the current bus operation and the priority device presents its function and address information upon receipt of PRIGNT. In this case, both the normal request and grant cycles have been eliminated.

In order to ensure that the system is not affected by failures which may occur in any one of the devices connected to the controller bus 50 and which form part of the controller 16, redundant devices are provided in the controller 16 in a ready condition for connection to the controller bus 50. Such devices are designated in FIGS. 2 and 3 by reference numerals having a prime associated therewith. Under control of the MMI processor 35/bus controller 40 combination, devices connected to the controller bus 50 are constantly checked as part of a standard diagnostic program and errors and other faults are also signalled from the individual devices to the MMI processor 35 via the ERR line of the controller bus 50. When failure of any device connected to the controller bus 50 occurs and is detected at the MMI processor 35, a procedure is automatically initiated for disconnection of that failed device from the controller bus 50 and for connection of the redundant device to the controller bus 50 in the place of the failed unit. This is generally accomplished as seen in FIG. 4 using the SUPV and SUPVCLK lines which uniquely extend from the bus controllers 40 to the other devices of the controller 16, which devices are selectively connectable to the controller bus 50 by way of individual switches SW located between the bus 50 and the edge connectors for the device circuit cards. Bus disconnect logic circuitry 18 associated with each of these devices responds to the physical address of the devices as indicated at the time the device card is plugged into the controller bus 50 via lines CS0–CS4 and the serial data received from the controller 40 via the line SUPV in synchronism with the clock signals applied to the line SUPVCLK.

As an example, FIG. 4 shows a system processor 25 and a bus controller 40 connected by way of switches SW to the controller bus 50. In addition, a redundant system processor 25' is also available for connection to the bus 50 via its switch SW. At any time a fault is detected in the system processor 25 by the MMI processor 35, the bus controller 40 applies to the SUPV line the physical address of the processor 25 along with a disconnect command as serial data in the format shown in FIG. 4A causing logic 18 in the processor 25 to release the switch SW. Also, the physical address of the redundant processor 25' along with a connect command is applied to line SUPV by the bus controller 40 to effect connection of the redundant processor 25' to the bus 50 in a similar way. This occurs automatically within the controller 16, resulting in fault correction without having to wait for outside maintenance. As seen in FIG. 4, even a redundant bus controller 40' is provided in the controller 16 for connection to the bus 50 by the MMI processor when failure of the bus controller 40 occurs.

In this way, redundancy is accomplished by inclusion in the controller 16 of one or more extra devices which can be dynamically switched into service when one of the active units malfunctions. Since all devices of a particular type are identical, it is not necessary to provide redundancy on a one-for-one basis, thereby minimizing the cost of provision of redundant elements within the system. In addition, when the spare device is switched into service, it is assigned the same logical address as the unit which failed, so that no program changes are required and the operation of the controller resumes exactly as before the failure occurred.

Figure 5A:
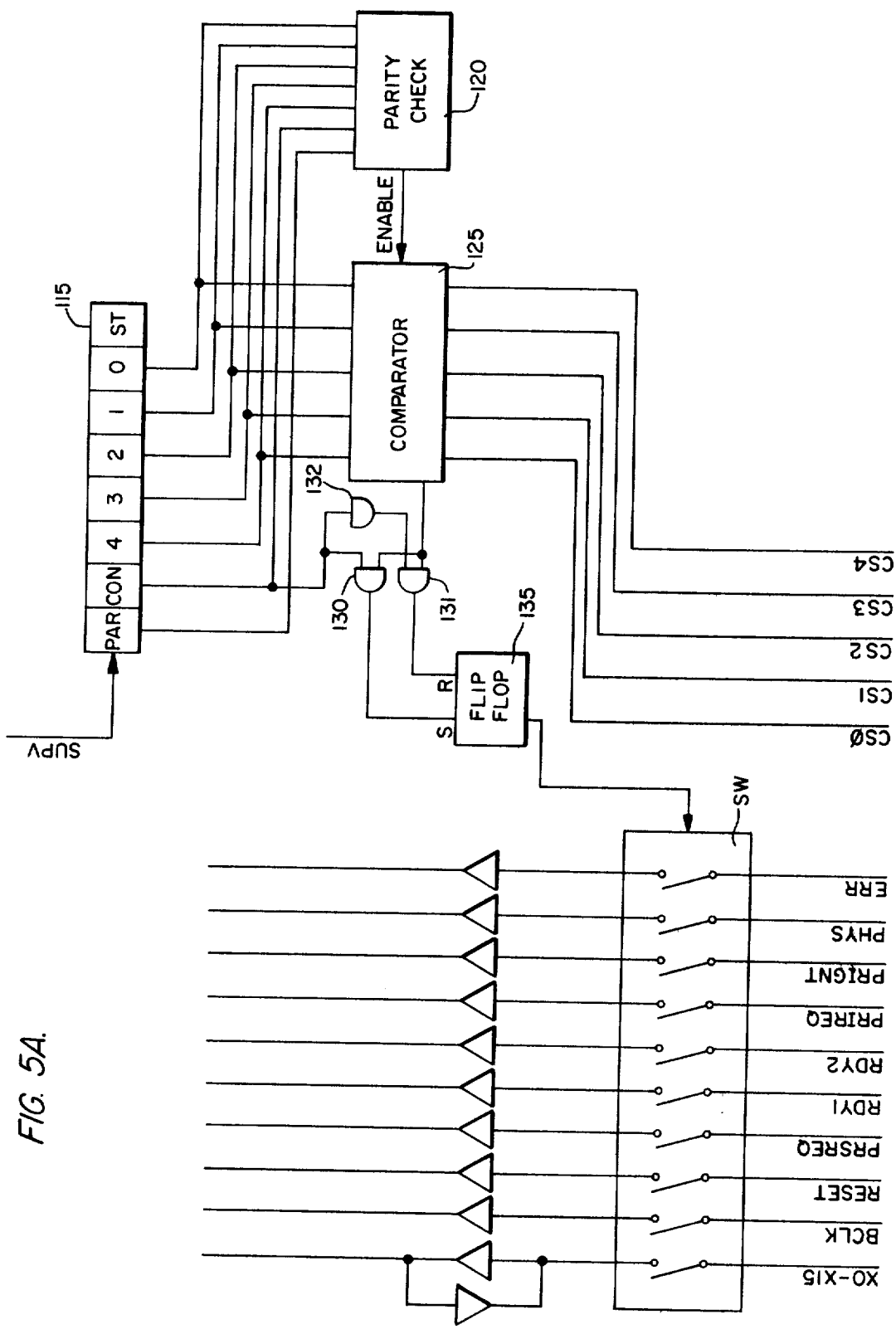
FIG. 5A is a schematic diagram of a typical controller bus device and its bus disconnect circuit.

Depending on system size and feature content, one or more system processors 25 are included in the controller 16 of each remote switching unit 12. The system processor may take the form of a Zilog Z8001 single chip 16 bit microcomputer. A general block diagram of the system processor 25 showing the basic elements thereof is seen in FIG. 5. The microprocessor 250 includes, in addition to a Z8001 chip, a crystal oscillator which provides for operation of the processor system at a 4 MHz rate. The processor chip 250 connects to the other elements of the processor via a 23 bit address (A) bus and a 16 bit bidirectional data (D) bus.

The local memory 252 associated with each system processor 25 includes both EPROM and dynamic RAM storage. Each word location of RAM and EPROM actually contains an additional 6 bit Hamming code for single or double bit error detection and single bit error correction, and the write byte operation is implemented via a word read-modify-write cycle so that the Hamming bits can reflect the proper code for the new word as a whole unit. In combination with this feature, the local memory 252 includes memory error detection and correction logic capable of providing single error correction of 16 bit data from RAM and EPROM memory for all read operations. This logic generates the six Hamming bits prior to a write operation for loading into the 22 bit wide RAM. Each read access to the processors local RAM memory is checked by the error detection and correction logic, and if a correctable error occurs, the logic provides the processor chip 250 with corrected data and automatically writes the corrected data back to memory. Each time such error correction occurs, a local corrected read error latch is set, which latch can be observed by the MMI processor 35 using a diagnostic read operation and can be reset only by that processor during a diagnostic write operation. On the other hand, if an uncorrectable read error is detected, the address is saved in an error address register 256, a non-maskable interrupt is generated to the processor chip 250 and a processor fault latch is set which can be observed by the MMI processor 35 in a similar manner to correctable errors. The memory error detection and correction logic, which has not been described or illustrated in detail herein, can take any known form of error detection circuitry depending upon the types of errors to be detected. For purposes of the present invention, it is sufficient to understand that error detection is provided within each system processor and other elements of the controller 16, which errors can be monitored by the MMI processor 35 as part of the diagnostic and control features of the present invention.

The memory protection circuit 254 serves to protect the more common data stored in various areas of the local memory 252 from unauthorized use. In this regard, the circuit 254 is provided in the form of a high speed RAM which stores memory protection bits associated with blocks of words in the local memory 252. During each memory access, the type of operation to be performed is compared against the protection bits previously loaded for that area of memory, and if a violation is detected, a non-maskable interrupt is generated to the processor chip 250 indicating the attempt at unauthorized access to the data.

The controller bus interface and control circuit 258 provides the various registers and control logic for sending or receiving data to and from the various elements of the system processor 25 to the controller bus 50. In combination with the interrupt logic 259, the circuit 258 is also responsible for generation and receipt of interprocessor interrupts. Interconnection of the system processor 25 to the controller bus 50 is effected through controller bus drivers and a bus disconnect circuit 260 by which a system processor 25 may be selectively disconnected from the bus 50 under control of the bus controller 40 when a fault has occurred therein, this circuitry also being the vehicle by which spare system processors 25' are selectively connected to the controller bus 50 in place of a faulty processor, as already described. In support of the logical/physical address scheme provided by the present invention for the switching in and out of redundant modules connected to the controller bus 50, the controller bus interface and control circuit 258 also provides the logic necessary to the physical-to-logical transformation of addresses as determined via the logical address loaded by the MMI processor 35 by way of the controller bus 50.

An example of the controller bus drivers and receivers and bus disconnect circuit 260 is seen in FIG. 5B. At the time a device card is plugged into the controller bus 50, the card slot address as provided on lines A0 through A4 provide a physical address for the device which corresponds to the card slot position along the controller bus 50 and is used by the MMI processor 35 for physical addressing of the devices on the controller bus 50. At the time a bus connect disconnect command is to be forwarded to one of the devices, a signal is applied to the SUPV line from the bus controller 40, having a format such as shown in FIG. 4A. This serial data is applied in common to a data register 115 in each device in synchronism with the clock signal received in line SUPVCLK. The parity bit, five bit address and the connect/disconnect command bit are applied from the data register 115 to a parity check circuit 120 to determine that the serial data has been correctly received. When parity is confirmed by the circuit 120, an enable signal is applied to a comparator 125 which receives the address bits stored in the data register 115 at one of its sets of inputs and the physical address of the device at its second set of inputs. Comparison between these two addresses indicates that the serial data is designated for that particular device as indicated by an output from the comparator 125 to a pair of AND gates 130 and 131, the AND gate 130 also receiving the connect/disconnect command bit from register 115 and the AND gate 131 also receiving this same command bit via an inverting gate 132. If the command bit stored in the register 115 represents a connect command, the gate 130 will be enabled to set a connect flip-flop 135. On the other hand, if the command bit in the register 115 represents a disconnect command, the gate 131 will be enabled to reset the flip-flop 135. Thus, depending upon the state of the connect flip-flop 135, the switch which connects the device at the edge connector to the conductors of the controller bus 50 is either enabled or released.

The random access memory 30 in the controller 16 provides for storage of the data base for the system processors 25 as well as temporary call processing data, and is designed to accommodate 16K, 32K, or 64K bit dynamic RAM chips. Like the other devices in the controller 16, the RAM 30 also includes error detection and correction logic of the type described in conjunction with the system processor 25 for detecting errors and identifying such errors and other malfunctions to the MMI processor 35.

The bus controller 40 provides the timing, arbitration and control logic necessary for operation of the controller bus 50. Requests for bus access from processors 25 and other devices connected to the bus 50 are solicited, arbitrated and granted by this device on a first-come, first-served basis. Bus timing errors and device data errors are detected by the bus controller 40 and relayed to the MMI processor 35 via the interface 255 the Z bus connection in the processor (see FIG. 5), which represents a direct noncontroller bus control/status/data path to the MMI processor 35. MMI processor 35 is basically identical in every respect to the system processor 25, but is dedicated to system initialization, configuration and diagnostic functions. Via its dedicated connection through the Z bus to the bus controller 40, the processor 35 has unique access to controller bus status and control functions as well as interface to external maintenance and diagnostic features.

In addition to the bus arbitration logic and timing control functions, the bus controller 40 comprises a collection of I/O devices which can be locally accessed by the MMI processor 35 via the Z bus connection. These separate I/O devices are provided generally in the form of a number of Intel 8259 interrupt controller chips along with Intel 8253 programmable interval timer chip to effect timing operations and Intel 8251 programmable communications interface chips to provide for transmission and reception of serial asynchronous data and control/status information.

The modem 55 is provided in the form of a full duplex 1200 bit per second modem and a FCC part-68 registered interface to a central office trunk to provide access to a remote diagnostic center for reporting of system status and execution of remotely-provided diagnostics. Thus, when a failure is detected in any one of the devices connected to the controller bus 50, in addition to the disconnection of the device from the bus 50 and the connection of a redundant device in its place, the MMI processor 35 automatically initiates communication to the remote diagnostic center via the modem 55 indicating the serial number, type of module, problem and location of the system. Thus, service personnel can immediately respond to the failure indication, effecting a replacement of the failed device at the earliest-possible time. However, it is of extreme importance to note that the system operation continues in spite of the failure of the device in the controller 16 in view of the automatic switching of a redundant device in place of the failed unit, so that no interruption to system operation occurs, nor does the system need to wait for service personnel to replace the failed unit before operation can continue.

The control panel 60 provides a control and display capability for service personnel within the system. Control is provided via a keypad and a group of unique function keys in combination with an alphanumeric display to indicate diagnostic results and system status. The interface from the control panel 60 to the MMI processor 35 is effected via the bus controller 40.

The second major portion of the remote switching unit 12 is the terminal portion which includes the ISL interfaces 70, the matrix 85 and the expanders 75, all of which are interconnected by the terminal bus 65 and the transmit and receive PCM buses 66 and 67. The matrix 85 which provides the data switching in the remote switching unit 12 may be a standard single stage nonblocking time slot interchange switch capable of 512 simultaneous connections, i.e., 512 inputs and 512 outputs. In a preferred embodiment of the invention, 384 of the input/output links through the matrix 85 are used for connection to the ports via the expanders 75 and port interface circuits 80. The remaining 128 links are available for connection to the interswitch links 14, providing for connection to terminals in other remote switching units 12 via the central switching unit 10. Thus, the matrix 85 provides non-blocking service for connections between terminals connected to the RSU 12 and concentration of slots to terminals in other remote switching units 12 via one or more ISL paths each providing 62 full duplex time slots carrying digitized voice samples or data.

One of the features of the present invention resides in the fact that the number of interswitch links 14 and the number of ports connected to the remote switching unit 12 can be selectively tailored to provide a non-blocking trunk switch to the central switching unit 10. In effect, the concentration of ports to the central switching unit 10 can be adjusted to achieve this non-blocking condition. As an example, it is possible to connect up to three expander circuits 75 to the matrix 85, each expander circuit accommodating up to 16 port interface circuits 80, each of which are associated with 8 ports or devices. As a result, such a remote switching unit 12 is capable of accommodating up to 8 ports times 48 port circuits 80 to equal 384 ports maximum. If a single ISL interface 70 is provided having only a single interswitch link 14 rather than a pair of interswitch links, the single interswitch link 14 will provide a total of 64 time slots, 62 of these time slots being capable of handling data, while one time slot provides synchronization and a second time slot provides signalling. Thus, the single interswitch link will provide an available 62 paths from the remote switching unit 12 to the central switching unit 10. The concentration provided by such an arrangement will therefore be 384 ports to 62 time slots.

On the other hand, a strictly non-blocking switching arrangement with the central switching unit 10 can be established by increasing the number of interswitch links 14 and reducing the number of ports associated with the remote switching unit 12. For example, if four interswitch links are provided by two ISL interface circuits 70, the number of time slots to the central switching unit 10 will increase to 4×62=248. If the number of ports is then reduced to 248 by providing only two expanders 75 and ports associated therewith, a completely non-blocking trunk switch to the central switching unit 10 is accomplished. In this way, the concentration of ports to the central switching unit 10 can be varied over a rather wide range from a concentration of 384/62 to a totally non-blocking configuration.

The terminal bus interface 45 in the controller 16 performs the data and address conversions required between the controller bus 50 and the terminal bus 65, forming a uniform data, control and status link between elements in the controller 16 and the other devices, such as the ISL interfaces 70, the expanders 75 and the matrix 85, which ultimately make data or voice connections external to the system. In addition, clock and synchronization signals required for operation of the matrix 85, expanders 75 and ISL interface PCM functions are generated by the terminal bus interface 45. Thus, the terminal bus interface 45 connects to the controller bus 50 in the controller 16 providing access and control by the system processors 25 and maintenance management interface processors 35, forming the control element for the terminal bus 65 and generating the master PCM timing signals for the remote switching unit 12 in which it resides.

Figure 6:
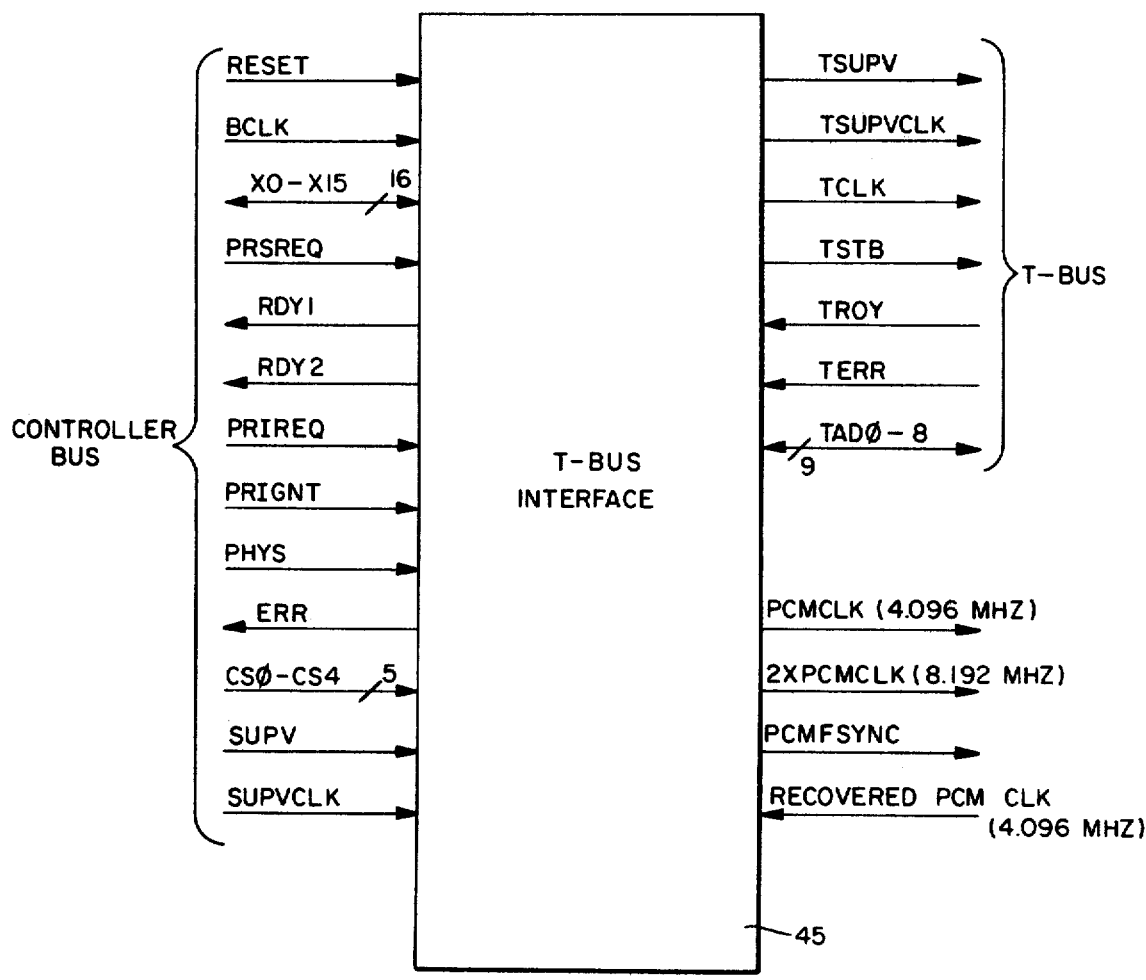
FIG. 6 is a schematic diagram of the signal line connections to the terminal bus interface from the controller bus and the terminal bus.

The terminal bus 65 is similar to the controller bus 50 in that it consists of a bidirectional bus on which function, address and data information are multiplexed along with control and synchronization provided on a small number of unidirectional lines generated by the terminal bus interface 45. These lines as they extend to the terminal bus interface 45 are shown in FIG. 6. The terminal bus 65 includes a line TCLK providing a clock signal from interface 45 which synchronizes all data transfers and timing on the terminal bus, which clock signal is independent of the PCM clock rate and the clock rate of the controller bus 50. The negative-going edge of the TCLK signal occurs at terminal bus bit cell boundaries. The line TSTB carries a negative-going pulse generated by the terminal bus interface 45 to establish the beginning of a terminal bus operation. Thus, the TSTB line is normally high, but goes low for one TCLK cycle coincident with the negative edge of TCLK during the last half of a function cycle. Activation of this TSTB line by the terminal bus interface 45 overrides all timing logic on devices connected to the terminal bus 65 and sets them unconditionally to the function cycle state. Each terminal bus cycle of approximately 500 nanoseconds corresponds to two TCLK cycles of approximately 250 nanoseconds each. The end of the TCLK cycle during which TSTB is low is defined to be the end of a terminal bus cycle and establishes synchronization between the TCLK and terminal bus cycles.

The TAD0–TAD8 lines of the terminal bus 65 represent a nine bit bidirectional address/function/data bus, with the line TAD8 being the odd parity bit for lines TAD0–TAD7. The line TERR is an error line driven by the devices connected to the terminal bus 65 when a parity error on the TAD0–TAD8 lines is detected during output from the terminal bus interface 45. The TRDY line is activated (driven low) by the addressed device to indicate to the terminal bus interface 45 that it has taken data (write operation) or is presenting the requested data (read operation). The terminal bus interface 45 performs a time-out on each terminal bus operation to provide completion of the operation in the event the TRDY line is not returned to normal condition indicating a faulty or absent device selected. The TSUPV and TSUPVLK lines perform the same functions with respect to those devices connected to the terminal bus 65 as the corresponding lines SUPV and SUPVCLK extending to the devices connected to the controller bus 50 in the controller 16 insofar as connection and disconnection of those devices from the associated bus is concerned. All terminal bus devices incorporate relays to provide for connection and disconnection to all terminal bus signals on the basis of these two supervisory lines in the same manner as already described in conjunction with the controller 16.

As seen in FIG. 6, the terminal bus interface 45 provides the timing and synchronization signals for operation of the remote switching unit 12, including a crystal oscillator for producing the master clock PCMCLK at 4.096 MHZ and a frequency doubler to produce the signal 2XPCMCLK at 8.192 MHZ. These two clock signals along with a frame synchronization signal PCMFSYNC are supplied to the devices connected to the terminal bus 65 for PCM operation.

Terminal bus operation occurs in the following way. When access to the terminal bus is initiated by an I/O address or memory-mapped I/O controller bus operation by a processor in the controller 16, the terminal bus interface 45 first initiates a function cycle by applying a function code to the lines TAD0–TAD7 along with a parity bit, a bit indicating whether the operation is a read or write operation and a bit to indicate whether the operation is initiated by an I/O address space controller bus operation or a memory address space controller bus operation. Following the function cycle, a memory operation is initiated by the terminal bus interface 45 during which the address of the device on the terminal bus is applied to the lines TAD0–TAD7, and at the same time, the TERR and TRDY lines are driven to the high (inactive) level as part of a precharge operation intended to ensure that these two lines will be set to the inactive level before their states are examined by the terminal bus interface 45. If the device connected to the terminal bus 65 which detected its own address during the function and address cycles also detected a terminal bus parity error during either or both cycles, that device will activate the TERR line during the first cycle following the address cycle, notifying the terminal bus interface 45 of the error.

Figure 7:
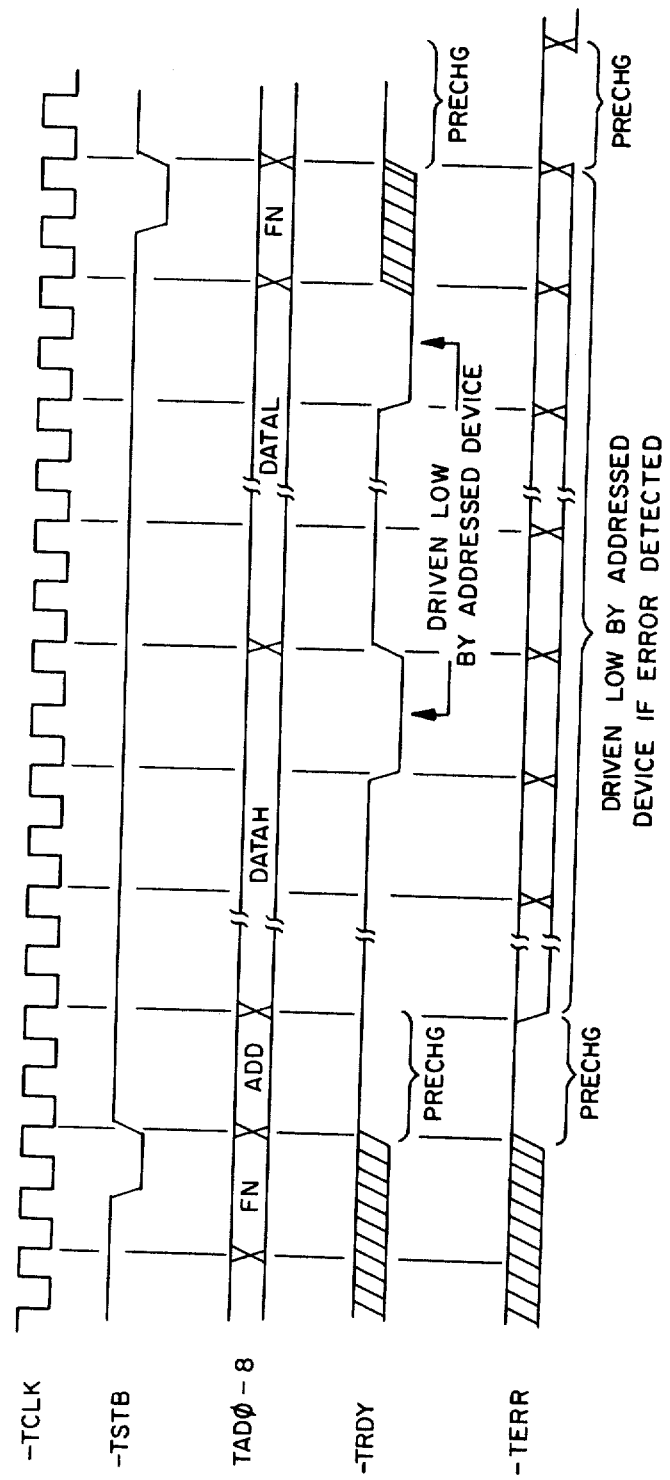
FIGS. 7 and 8 are signal timing diagrams relating to write and read operations, respectively, on the terminal bus.
Figure 8:
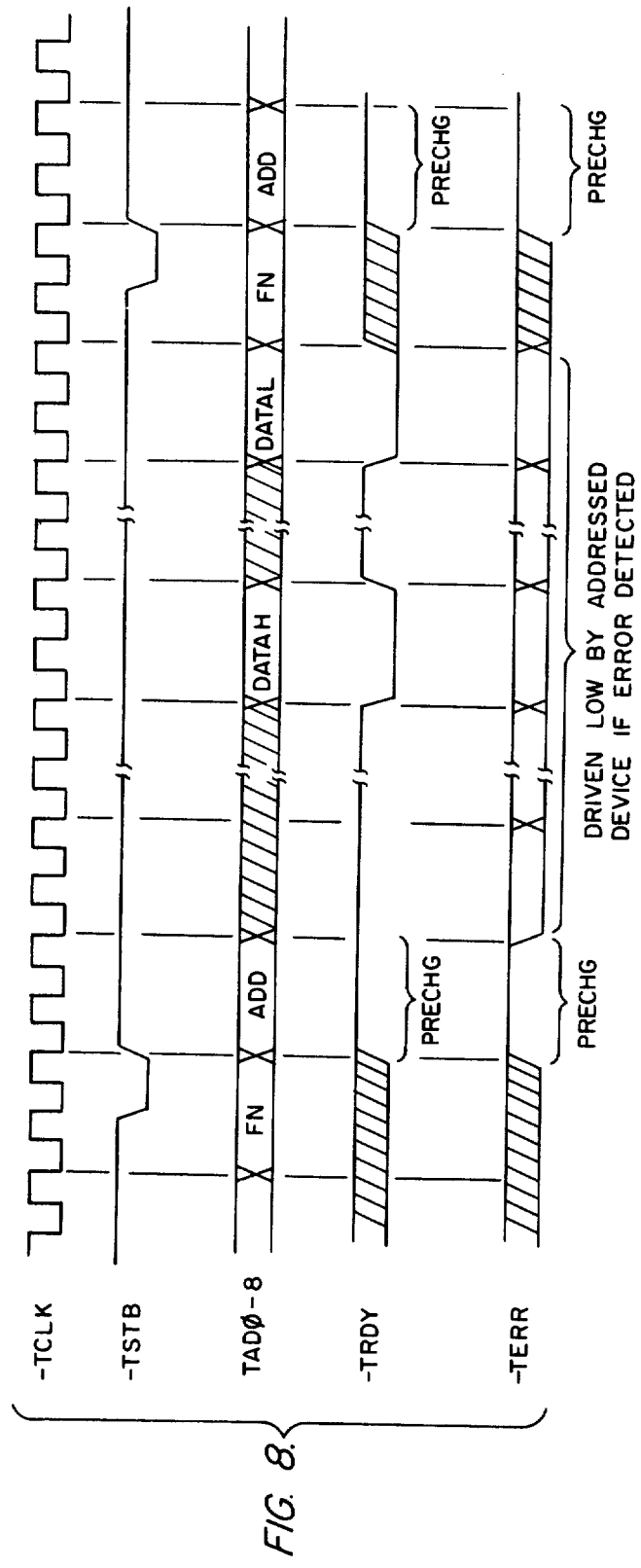

If the operation being performed is a WRITE operation, for example, the terminal bus 45 places the high byte (bits 8–15) of the word to be transferred on the TAD0–TAD8 lines during the next cycle following the address cycle, as seen in FIG. 7. This data remains on the bus until the end of the cycle during which the addressed device indicates ready by activating (driving low) the TRDY line. If the operation is a word transfer, the terminal bus interface 45 places the low byte (bits 0–7) of the word to be transferred on the TAD0–TAD8 lines during the next cycle and this data also remains on the bus until the end of the cycle during which the addressed device again indicates ready by way of the TRDY line. If the addressed device detects a parity error on the TAD0–TAD8 lines during any cycle when the terminal bus interface 45 is applying the high or low data bytes to the bus, an indication of the error is forwarded by the device by activating the TERR line. In the case of either a byte or a word transfer, the last cycle during which the addressed device activates the TRDY line may be immediately followed by the next function cycle from the terminal bus interface 45. Also, if the operation is a READ operation rather than a WRITE operation, the same basic functions occur except that the TRDY line is utilized by the address device to indicate when its data is ready to be read and the terminal bus interface 45 reads that data at the end of the cycle during which the TRDY line is activated by the address device, as seen in FIG. 8.

Thus, the terminal bus interface 45 resides on the controller bus 50 in the same manner as the other devices connected to that bus, and in normal operation, captures the physical address during each controller bus grant cycle to determine if the device to whom bus access was granted is a system processor 25 or an MMI processor 35. The function and address cycles occurring subsequent thereto are also captured, and if the I/O or memory addresses conveyed during the controller bus function and address cycles corresponds to a terminal bus address serviced by the terminal bus interface 45, a terminal bus operation is initiated in the manner already described.

The terminal bus 65 is the vehicle by which messages relating to control and switching information is passed between processors in the remote switching unit 12 and processors in the central switching unit 10 via the interswitch links 14 as well as the path for such control/status information from the ports to the processors in the remote switching unit itself. Thus, the terminal bus 65 cooperates with the XMT PCM bus 66 and the RCV PCM bus 67 to provide control/status information and voice data to the processors, switching matrices, ports and ISL interface circuits within the system.

Figure 9A:
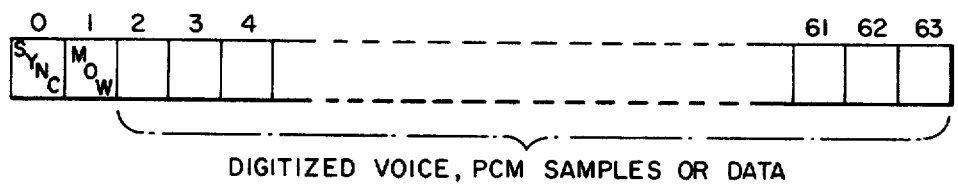
FIG. 9A is a diagram showing the data frame format on the interswitch link.

FIG. 9A illustrates the timing and synchronization of communications on the interswitch links 14 between the remote switching unit 12 and the central switching unit 10. As already indicated, each interswitch link consists of continuously-repeated frames of 64 time slots, each time slot carrying eight bits. The first time slot carries the synchronization byte identifying the beginning of the frame format, which is necessary since the phase of the received or transmitted frame is unknown due to the time delay from the remote switching unit 12 or central switching unit 10. The second time slot is reserved to the multiplexed orderwire data channel by which data is transmitted in message form over the interswitch link and applied to the terminal bus 65 for application to a processor in the controller 16. The remaining time slots 2 through 63 represent digitized voice, PCM samples or data in digital form. Since each ISL interface 70 may be associated with a pair of interswitch links 14, a total of 128 time slots via the interswitch links 14 will be available in the remote switching unit 12. Where the maximum of two ISL interface circuits 70 is provided, a total of 256 time slots are available.

Figure 10:
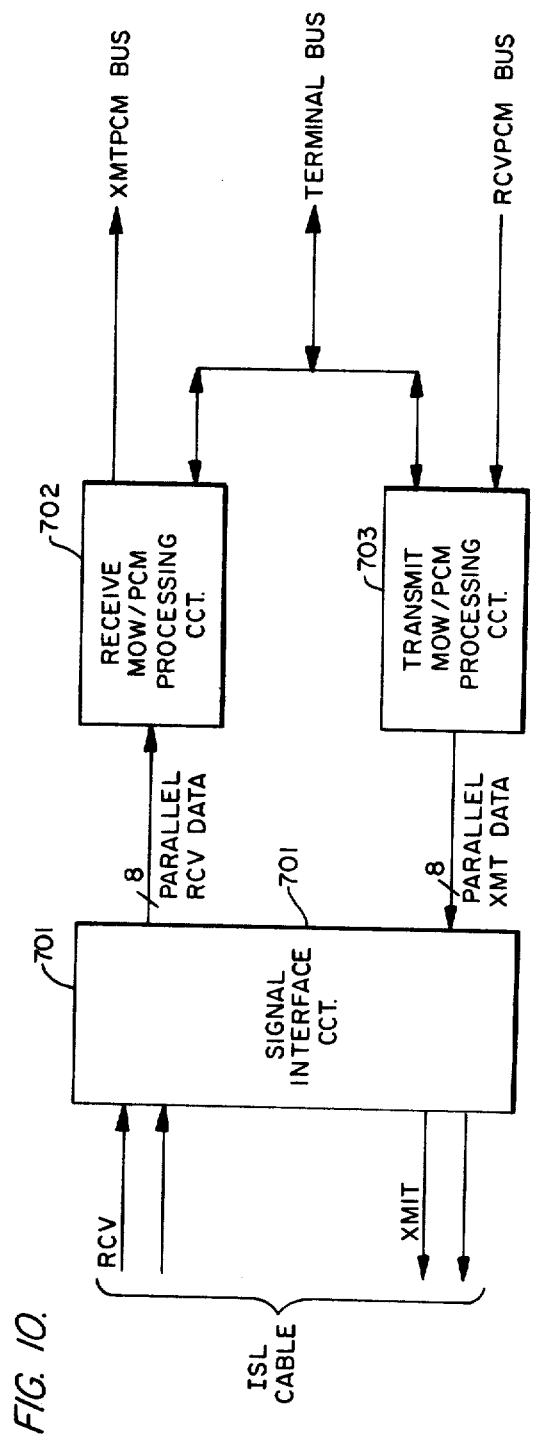
FIG. 10 is a general block diagram of the ISL interface.

FIG. 10 shows a simplified block diagram of one ISL section of the ISL interface 70, in which the respective transmit and receive pairs of the ISL cable are connected with a single interface circuit 701 which serves to convert the serial received data to parallel form and the parallel transmit data to serial form. The parallel receive data is applied to a receive MOW/PCM processing circuit 702 where transmit PCM data in time slots 2 through 63 are applied to the XMTPCM bus 66 and the multiplex orderwire data from time slot 1 is assembled into message form and applied to the terminal bus 65. Similarly, the receive data from RCVPCM bus 67 is applied to a transmit MOW/PCM processing circuit 703 along with multiplex orderwire data from the terminal bus 65, from which parallel transmit data is applied through the interface circuit 702 to the transmit pair of the ISL cable.

Figure 11:
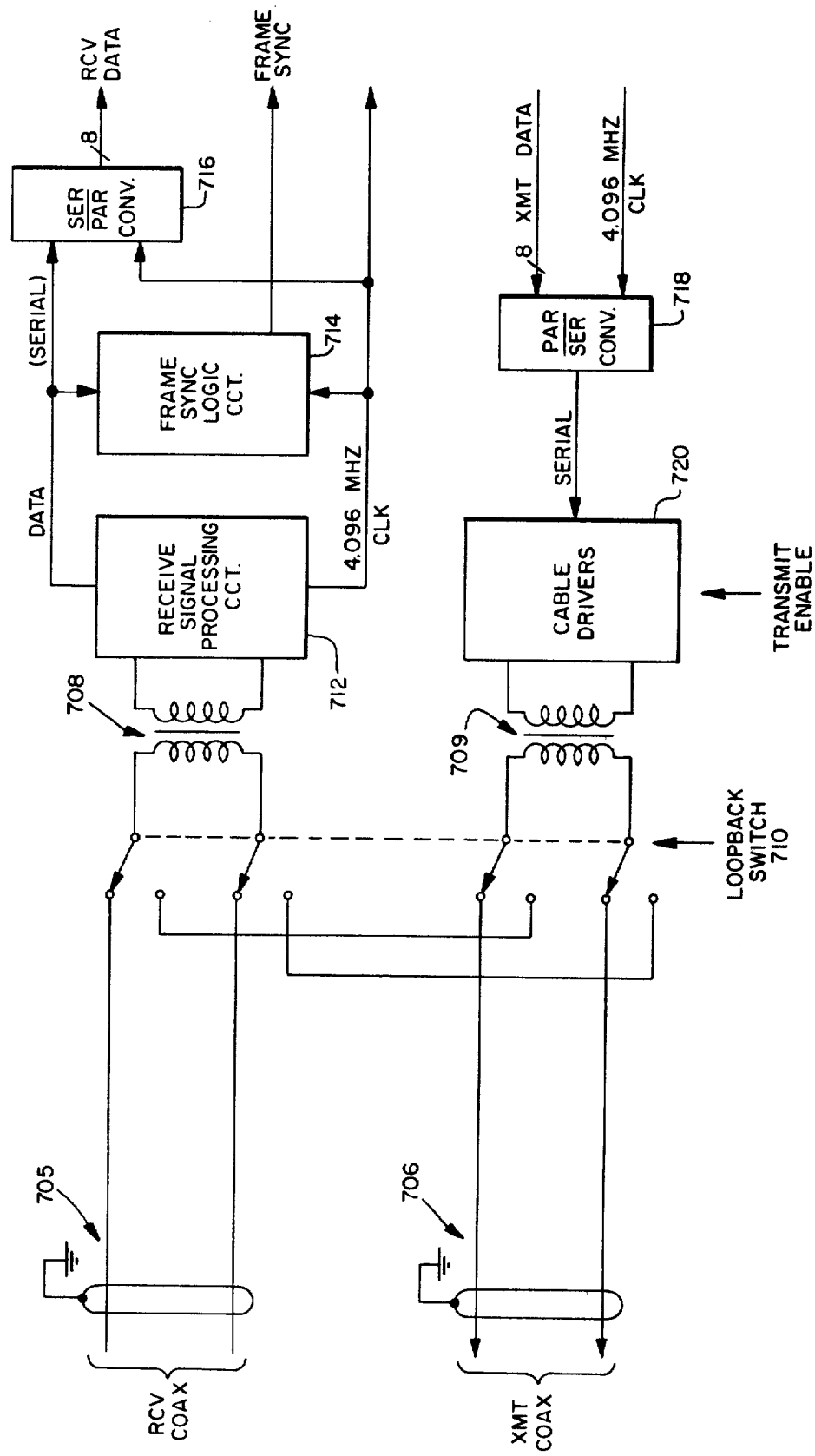
FIG. 11 is a schematic diagram of the signal interface circuit in the ISL interface.

The signal interface circuit 701 is shown in more detail in FIG. 11. The serial 4.096 MHz ISL data is received on a coax 705 and applied through a loop back switch 710 through a coupling transformer 708 to the receive signal processing circuit 712, which provides amplification and filtering to recover the logic level of the serial received data. In addition, a stable 4.096 MHz clock is recovered by a phase lock loop from the receive bit stream and is passed onto other logic within the ISL interface 70. The recovered serial data and clock are then applied to a frame synchronization logic circuit 714 to determine the location of the synchronization byte (zero time slot) in the received frame format. The frame synchronization logic circuit 714 establishes this reference and generates a frame synchronization signal which is used by other logic within the ISL interface 70. The serial data from the circuit 712 is also at this time applied to a serial/parallel converter 716 to convert the data to parallel form.

Parallel data for transmission on the interswitch link 14 is received in the signal interface circuit 701 from the transmit MOW/PCM processing circuit 703 at a parallel/serial converter 718 along with the master 4.096 MHz clock signal and is converted by the circuit 718 to serial form and applied to the cable drivers 720. The serial data is then applied through the transformer 709 and the loop back switch 710 to the transmit pair 706. The transformers 708 and 709 provide DC isolation and maximize common mode noise rejection. The loopback relay 710 is used to selectively route the serial data from the cable drivers 720 to the input of the receive signal processing circuit 712 to provide for loop back testing in the ISL interface 70.

Figure 12:
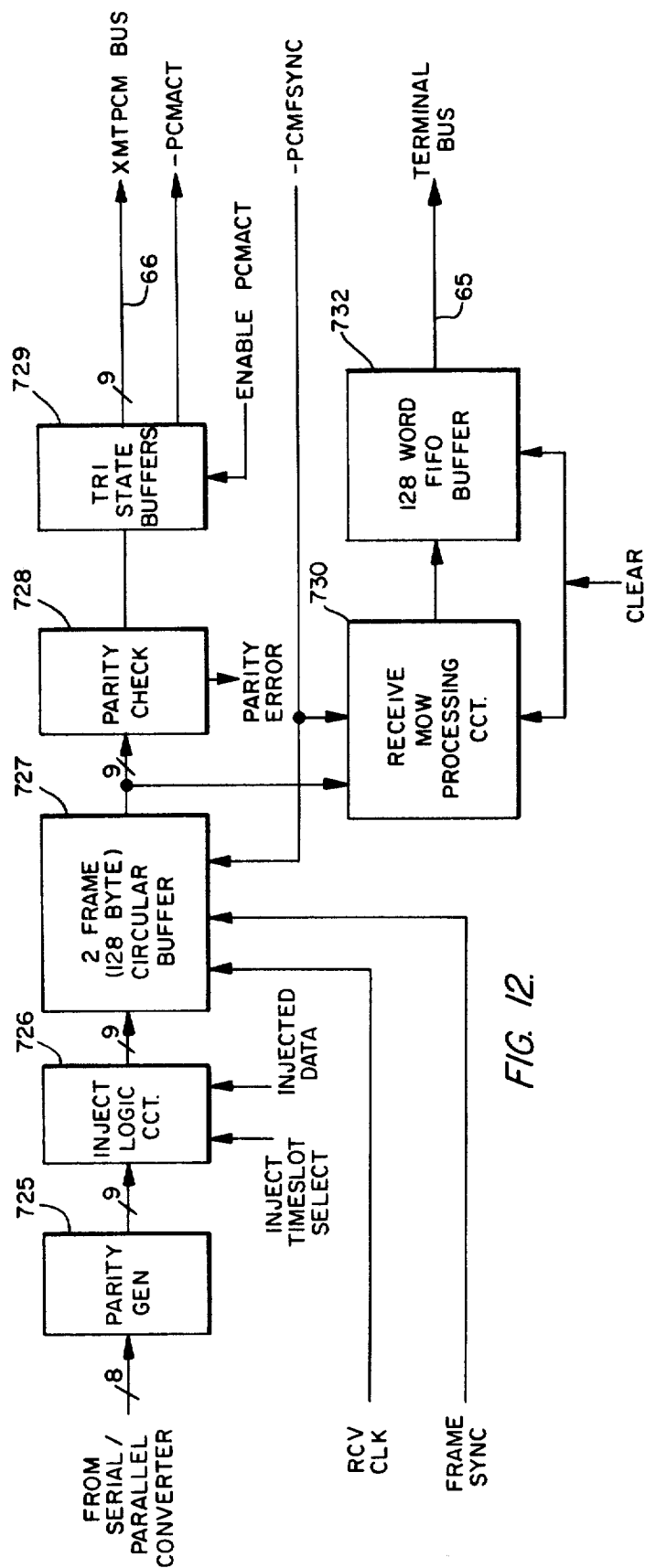
FIG. 12 is a schematic diagram of the receive MOW/PCM processing circuit in the ISL interface.

The details of the receive MOW/PCM processing circuit 702 are seen more particularly in FIG. 12. The eight bit parallel data bytes from the serial to parallel converter 716 in the signal interface circuit 701 are applied to an odd parity generator 725 which adds a parity bit to the eight data bits producing a nine bit output to an inject logic circuit 726. The circuit 716 is a simple multiplexing circuit which provides the ability to replace the nine bits from the parity generator 725 in any one of the sixty-four time slots with a predetermined value to allow for testing of proper frame buffer addressing by having known data in the buffer location. Proper passage of the data through the following frame buffer 727 and onto the matrix 85 can then be verified by monitor circuitry. The buffer 727 is required since all ISL interface circuits 70 in the remote switching unit 12 must communicate with the PCM buses 66 and 67 on the basis of one RSU-wide time base, but the receive data in each interswitch link 14 in general is not in frame phase with this time base.

The frame buffer 727 for each of the two interswitch links 14 associated with a given ISL interface circuit 70 is actually provided in the form of two sixty-four byte (one frame) buffers. The least-significant part of the WRITE address is the time slot number (0–63) of data received from the interswitch link 14; while, the least-significant part of the read address is the current remote switching unit matrix time slot number. The most-significant bit of each address normally alternates once per frame so that all 128 locations are written and read sequentially during two frames.

Parity is checked at the output of the frame buffer 727 by a parity check circuit 728 and then the data is applied to the tristate buffer 729 for application to the XMTPCM bus 66.

Figure 9B:
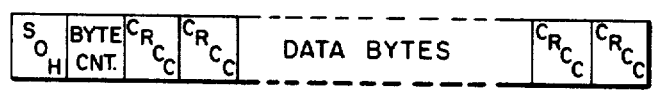
FIG. 9B is a diagram showing the message format on the multiplexed orderwire channel.

The byte parallel data stream from the frame buffer 727 is also applied to a receive MOW processing circuit 730 which extracts the byte in the MOW time slot (see FIG. 9A) in each frame and processes these bytes as the MOW data channel by compiling the bytes into a message format, as seen in FIG. 9B. Each message begins with a start of header (SOH) control character followed by a byte count for the message. Following the SOH and byte control characteristics is a CRCC accumulator for these two bytes. This is followed by the indicated number of bytes for the message concluding with the CRCC accumulation. In the receive MOW processing circuit 730, the byte count for the message is stored and the data bytes are then received and the CRCC accumulation is automatically performed. Receipt of each data byte decrements the stored byte count and at the appropriate time, the CRCC value of the received message is compared with the accumulated value to determine if an error has occurred. All data, including the SOH character, the byte count, the data and the CRCC bytes, is placed into a FIFO buffer 732 for application to the terminal bus 65.

Figure 13:
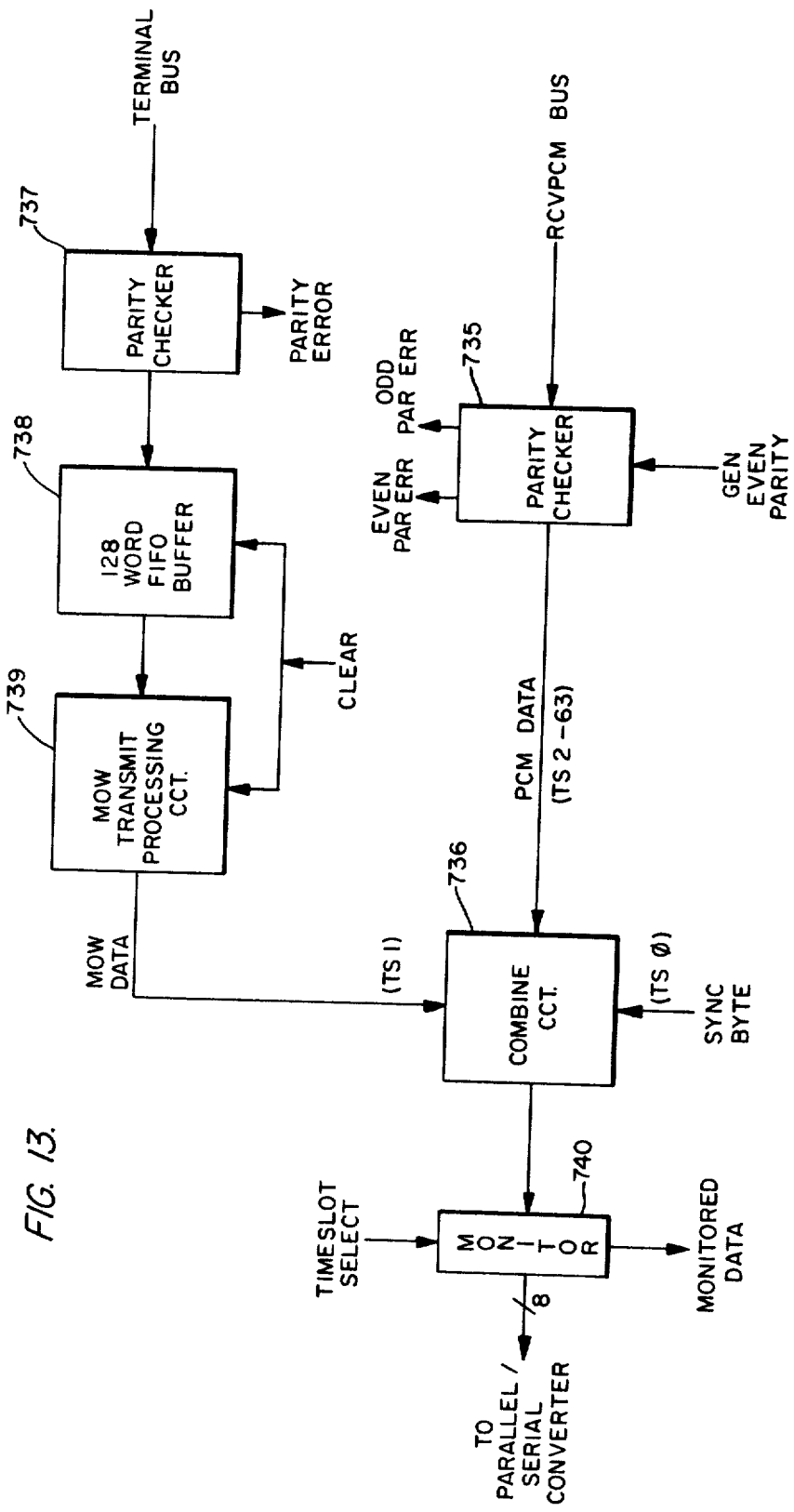
FIG. 13 is a schematic diagram of the transmit MOW/PCM processing circuit in the ISL interface.

FIG. 13 illustrates the transmit MOW/PCM processing circuit in greater detail. Parallel-multiplexed data from the RCVPCM bus 67 from the matrix 85 is applied to a parity checking circuit which responds to a program control bit for odd/even parity for detecting both even parity errors and odd parity errors. The output of the parity checking circuit 735 is applied as PCM data relating to time slots 2 through 63 to a combining or multiplexing circuit 736 where the synchronizing byte (time slot 0) and the MOW data (time slot 1) are added. The MOW data is obtained from the terminal bus 65 at the parity checking circuit 737 and is applied to a FIFO buffer 738. The SOH, byte count and data words are provided, and the MOW processing circuit 739 maintains a current count (0–127) of complete messages in the buffer 738.

The MOW data bytes, the PCM data from the PCM bus and a fixed synchronization byte are merged in the combining circuit 736 to form the complete ISL byte stream. The synchronization byte goes in time slot 0, the MOW byte goes in time slot 1, and the PCM data is used for time slots 2–63. The merged parallel data stream is then passed to the parallel/serial converter 718 in the signal interface circuit 701 of the ISL interface 70 via a monitor circuit 740 which permits the monitoring of the data stream in accordance with a selected time slot to provide for verification of the transmit logic.

The expanders 75 in the remote switching unit 12 form the interface between the ports via the port interface circuits 80 and the RSU terminal bus 65 and the PCM buses 66 and 67. Basically, the expander merely provides for data steering between the ports and the respective buses 65–67. As already indicated, the terminal bus 65 provides a path from system processors 25 and MMI processors 35 in the controller 16 to and from the individual ports for exchange of control, status and data information. In this respect, the expander 75 provides for conversion of this signalling from parallel to serial and serial to parallel form between the ports and the buses 65–67 and performs standard steering functions of the type well known in the art. As is standard in the remote switching unit 12, a spare expander 75 may be connected to the buses 65–67 to provide backup for the on-line expander unit 75' in the event of failure thereof, the switching of the failed unit off of the buses and the switching of the spare expander unit onto the buses being effected in the manner already described in conjunction with redundant devices in the controller 16, this automatic switching again being accomplished under control of the MMI processor 35 and bus controller 40 via the terminal bus interface 45.

Figure 14:
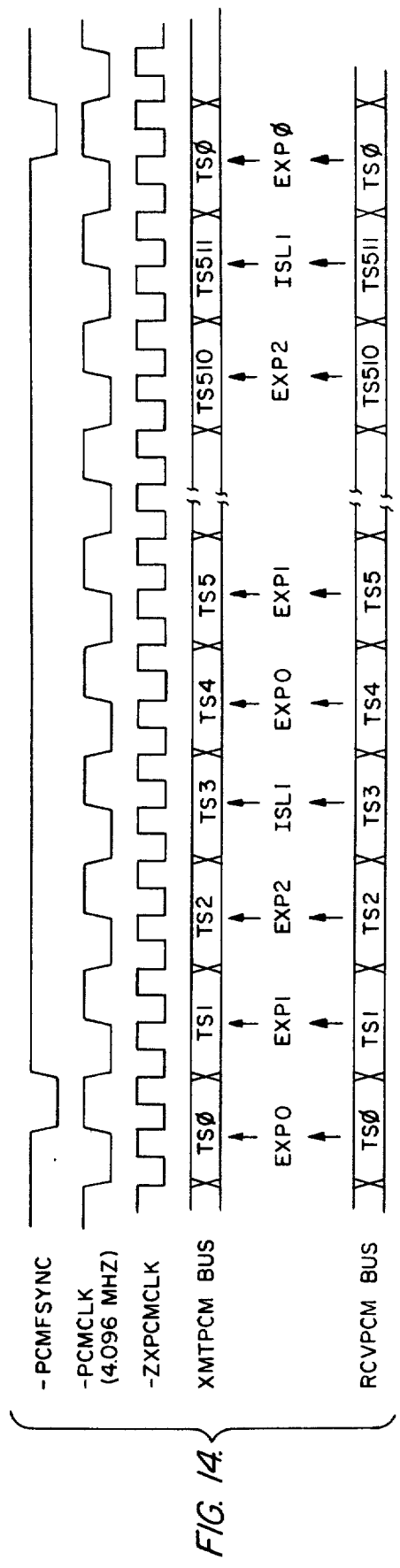
FIG. 14 is a timing signal diagram showing the manner of time slot allocation on the PCM buses.

The matrix 85 in the remote switching unit 12 may be provided in the form of a standard digital time slot interchange switch of the type which is known in digital switching systems. An example of a time-space-time switch is disclosed in the Charransol et al U.S. Pat. No. 4,093,827, issued June 6, 1978; although, other types of matrix switches, such as an "all time switch", may be used without departing from the spirit of the present invention. In the preferred embodiment disclosed herein, a digital time-only interchange device in the form of a 512 link non-blocking switch is utilized having a time slot allocation as illustrated in FIG. 14, in which data from the three expanders 75 and the ISL interface 70 are sampled in blocks of sequential time slots.

As already indicated, the central switching unit is essentially of identical construction to the remote switching unit 12 with the exceptions that the controller also provides for connection by coaxial cable between the terminal bus interface 45 and the data management subsystem 2 via the coaxial interprocessor bus 4, and by the fact that the buses 65–67 interconnect a plurality of ISL interface circuits 70 and a conference bridge 90 with the CSU switching matrix 85. Otherwise, the controller 16 in the central switching unit 10 is configured and operates in exactly the same manner as the controller 16 in each of the remote switching units 12 and the timing and control of the switching operation associated with the terminal bus 65, XMTPCM bus 66, RCVPCM bus 67 and the CSU matrx 85 is the same as described in conjunction with the remote switching unit 12.

From the foregoing description it should be apparent that the present invention provides a switching system in which terminals 3 connected to a common remote switching unit 12 may be switched via the matrix 85 located within the unit 12 itself, while stations which require connection to other remote switching units are automatically switched through their own remote switching unit via the interswitch link and the central switching unit 10 to the destination remote switching unit 12. By proper configuration of the station versus ISL link allocations for each remote switching unit 12, non-blocking switching through the central switching unit 10 is possible; while non-blocking switching through the remote switching unit 12 is always maintained. In addition, the direct connection between the central switching unit 10 and the data management subsystem 2 via the interprocessor bus 4 provides for the storing of all records produced by operation of the system, such as call billing information, and supplies data required to configure the system to a particular customer's requirements including the allocation of terminals, the establishment of classes of service and the storage of data relating to system use, such as directly and connection information.

The diagnostic capabilities of the system also provide a degree of reliability which has not heretofore been achieved in other systems of a similar type. Automatic detection of device failures, recording and identification of system errors and automatic replacement of failed components maintains the system in operation at all times, while providing immediate automatic notification to service personnel of the occurrence of faults so that faulty devices and other components can be immediately replaced in the system subsequent to automatic switchover to standby devices. As compared to other redundancy schemes where entire systems are provided on a redundant basis, the present invention represents a particularly effective means for maintaining system operation in the face of component failure at the lowest-possible cost and with the highest efficiency.

The versatility in the switching configuration provided by the present invention also exceeds that typically found in devices of the prior art. The ability to switch between locally-connected stations in the remote switching units while providing similar switching for connection between stations associated with different remote switching units allocates the switching tasks between a number of units in such a way as to provide the maximum efficiency in switching between stations in a non-blocking manner. In addition, the modular makeup of the system, which provides a simple means for increasing system size by addition of expander circuits in the remote switching units and the addition of remote switching units to the system allows the system to be designed for each user's requirements and permits future growth as the user's requirements change.

While we have shown and described various embodiments in accordance with the present invention, it is understood that the invention is not limited to the details shown and described herein but is intended to cover obvious changes and modifications known to one of ordinary skill in the art, and We therefore do not wish to be limited to the details shown and described herein, but intend to cover all such changes and modifications obvious to those skilled in the art.

What is claimed is:

1. A digital information switching system comprising
a plurality of terminal devices providing respective digital information signals;
a plurality of processor controlled first switching means each connected to a respective group of terminal devices for effecting interconnection between the devices connected thereto on a time slot exchange basis;
a second processor controlled switching means connected to each of said first switching means via a respective interswitch link for effecting interconnection on a time slot exchange basis between terminal devices connected to different ones of said first switching means; and
each of said first and second switching means including switching matrix means for selectively interconnecting inputs thereto and outputs therefrom by time slot interchange and controller means for controlling said switching matrix means on the basis of control information from said terminal devices;
wherein said controller means in each of said first and second switching means comprises a plurality of devices including a system processor, a random access memory device and a bus interface circuit connected in parallel to a controller bus for effecting transfer of address and data signals between said devices, said first and second switching means each further including terminal bus means for connecting said bus interface circuit to said switching matrix means for effecting control thereof by said system processor, maintenance processor means connected to said controller bus for detecting failure of a device connected to said controller bus and transmission means connected to said maintenance processor means for automatically transmitting data to a remotely-located service center identifying said failure.

2. A digital information switching system comprising
a plurality of terminal devices providing respective digital information signals;
a plurality of processor controlled first switching means each connected to a respective group of terminal devices for effecting interconnection between the devices connected thereto on a time slot exchange basis;
a second processor controlled switching means connected to each of said first switching means via a respective interswitch link for effecting interconnection on a time slot exchange basis between terminal devices connected to different ones of said first switching means; and
each of said first and second switching means including switching matrix means for selectively interconnecting inputs thereto and outputs therefrom by time slot interchange and controller means for controlling said switching matrix means on the basis of control information from said terminal devices;
wherein said controller means in each of said first and second switching means comprises a plurality of devices including a system processor, a random access memory device and a bus interface circuit connected in parallel to a controller bus for effecting transfer of address and data signals between said devices, said first and second switching means each further including terminal bus means for connecting said bus interface circuit to said switching matrix means for effecting control thereof by said system processor, a plurality of redundant devices in ready condition for connection to said controller bus, maintenance processor means connected to said controller bus for detecting failure of a device connected to said controller bus and switch means responsive to said maintenance processor means for automatically disconnecting a failed device from said controller bus and for connecting a corresponding redundant device in place thereof.

3. A digital information switching system comprising a plurality of terminal devices providing respective digital information signals;

a plurality of remote switching units each including a local switching matrix for selectively interconnecting a plurality of inputs thereto and a plurality of outputs therefrom by time slot interchange, port interface means connected to a number of said terminal devices, local terminal bus means for connecting said port interface means to said local switching matrix and processor controlled controller means connected to said local terminal bus means for controlling said local switching matrix;

a central switching unit including a central switching matrix for selectively interconnecting a plurality of inputs thereto and a plurality of outputs therefrom by time slot interchange, processor controlled controller means for controlling operation of said central switching matrix and terminal bus means for connecting said controller means to said central switching matrix; and a plurality of interswitch links, each link including means for interconnecting the local terminal bus means in a remote switching unit to the terminal bus means in said central switching unit to provide a multiplexed digital data communication path therebetween, wherein said central switching unit and said remote switching units have link interface means connected to the terminal bus means therein and a respective end of each interswitch link extending to that switching unit, each link interface means multiplex control information and voice/-data PCM information from said terminal devices and said controller means onto said interswitch links.

4. A digital information switching system according to claim 3 wherein the multiplexed data on said interswitch links occupies a data frame comprising a predetermined number of time slots and wherein at least one of said remote switching units has plural interswitch links connecting it to said central switching unit, the total number of time slots occupying the data frames of the interswitch links connected to said one remote switching unit being equal to the number of terminal devices connected to that one remote switching unit.

5. A digital information switching system according to claim 3 wherein said digital information signals from said terminal devices comprise both coded voice and digital data, and wherein said port interface means provides for separation of said coded voice and digital data portions of said digital information signals.

6. A digital information switching system according to claim 5 wherein the local terminal bus means in said remote switching units includes a transmit bus and a receive bus for carrying coded voice or data signals to and from said local switching matrix and a terminal bus for carrying digital data between the port interface means, said controller means and said link interface means.

7. A digital information switching system comprising a plurality of terminal devices providing respective digital information signals;

a plurality of remote switching units each including a local switching matrix for selectively interconnecting a plurality of inputs thereto and a plurality of outputs therefrom by time slot interchange, port interface means connected to a number of said terminal devices, local terminal bus means for connecting said port interface means to said local switching matrix and processor controlled controller means connected to said local terminal bus means for controlling said local switching matrix;

a central switching unit including a central switching matrix for selectively interconnecting a plurality of inputs thereto and a plurality of outputs therefrom by time slot interchange, processor controlled controller means for controller operation of said central switching matrix and terminal bus means for connecting said controller means to said central switching matrix; and a plurality of interswitch links, each link including means for interconnecting the local terminal bus means in a remote switching unit to the terminal bus means in said central switching unit to provide a multiplexed digital data communication path therebetween, wherein the controller means in at least one of said central and remote switching units includes a plurality of system processors, a pair of random access memory circuits and a bus interface circuit connected in parallel to a controller bus, and switching control means connected to said controller bus and responsive to a failure of one of said system processors or said memory circuits for automatically disconnecting the failed device from said controller bus.

8. A digital information switching system according to claim 7 wherein said bus interface circuit includes means for connecting said controller bus to said terminal bus in said one switching unit.

9. A digital information switching system according to claim 7 wherein said controller means in at least said one switching unit includes maintenance means connected to said controller bus for operating said switching control means upon detection of said failure, and transmission means connected to said switching control means for transmitting identification of the failed device to a remotely-located central service center.

10. A processor bus system comprising a multiconductor bus for carrying address, data and control information; a plurality of devices of different types connectable in parallel to said bus including a system processor, a memory circuit and maintenance means for detecting the failure of any of said devices; switch means for individually connecting said devices to said bus; and logic means responsive to a command from said maintenance means detecting a failure of one of said devices for selectively operating said switch means to disconnect said one device from said bus, wherein said devices include redundant devices such as said system processor, said memory circuit and said maintenance means, which redundant devices are also selectively connectable to said bus by said switch means; said logic means including means responsive to said command from said maintenance means for operating said switch means to connect a redundant device of corresponding type to said bus upon failure of a device of that type while connected to said bus.

11. A processor bus system according to claim 10 wherein each position on said bus at which a device may be connected is identified by a respective physical address comprising a combination of bits provided at the position by conductors in said bus, said combination of bits forming each physical address in the device as it is connected to said bus.

12. A processor bus system according to claim 11 wherein each device includes means for storing a logical address by which said device is accessed via said bus, said maintenance means including means for accessing said devices via their physical addresses for storing a respective logical address in the storing means thereof.

13. A processor bus system according to claim 11 wherein said maintenance means includes means for generating a command in the form of a device physical address and a command bit indicating connection or disconnection of the device, and means separate from said bus for carrying said command to all of said devices in common.

14. A processor bus system according to claim 13 wherein said logic means is provided in each of said devices and includes in each device comparator means responsive to a physical address in a command from said maintenance means and the physical address received from said bus for generating a switching signal and gate means responsive to the command bit in said command for applying said switching signal to said switch means to selectively connect or disconnect the device from said bus.

15. A processor bus system according to claim 10 including plural processors connected to said bus.

16. A processor bus system according to claim 10 wherein each device includes error detection means for detecting errors in the operation of the device and means for transmitting indications of such errors to said maintenance means via said bus.

17. A processor bus system comprising a multiconductor bus for carrying address, data and control information; a plurality of devices of different types connectable in parallel to said bus including a system processor, a memory circuit and maintenance means for detecting the failure of any of said devices; switch means for individually connecting said devices to said bus; and logic means responsive to a command from said maintenance means detecting a failure of one of said device for selectively operating said switch means to disconnect said one device from said bus, further including modem means connected to said maintenance means for transmitting a fault signal to a remotely-located service station in response to detection of failure of a device connected to said bus.

18. A processor bus system comprising a multiconductor bus for carrying address, data and control information; a plurality of devices of different types connectable in parallel to said bus including a system processor, a memory circuit and maintenance means for detecting the failure of any of said devices; switch means for individually connecting said devices to said bus; and logic means responsive to a command from said maintenance means detecting a failure of one of said devices for selectively operating said switch means to disconnect said one device from said bus, further including data management means for processing data relating to the operations of said devices on said bus, a data bus connected to said data management means and interface means for connecting said data bus to said multiconductor bus to which said devices are connected.

19. A method of controlling the connection of devices to a multiconductor bus in a processor bus system including a plurality of primary devices of different types including a processor and a memory circuit, and a plurality of redundant devices of the same type as said primary devices, comprising the steps of connecting said primary devices to said bus at positions identified by physical addresses;
receiving in each device signals representing the physical address of the position at which it is connected to said bus;
storing in each device connected to said bus signals representing a respective logical address by which that device may be accessed from said bus;
detecting failure of one of said primary devices; and disconnecting a failed primary device from said bus and automatically connecting a redundant device of the same type as the failed primary device to said bus upon detection of said failure.

20. A method as defined in claim 19, further including storing in the redundant device connected to said bus the logical address previously stored in the failed primary device which it replaces.

21. A method as defined in claim 20 wherein said disconnecting of a failed primary device includes forwarding to said failed primary device a signal including its physical address and a command for disconnection from said bus.

22. A method as defined in claim 20 wherein said step of detecting failure of a primary device is performed by a digital processor in response to diagnostic procedures performed over said bus.

23. A method as defined in claim 21 wherein said connecting of a redundant device includes forwarding to said redundant device a signal including its physical address and a command for connection to said bus.

24. A digital information switching system comprising a plurality of terminal devices providing respective digital information signals;
a plurality of processor controlled first switching means each connected to a respective group of terminal devices for effecting interconnection between the devices connected thereto on a time slot exchange basis; and
a second processor controlled switching means connected to each of said first switching means via a respective interswitch link for effecting interconnection on a time slot exchange basis between terminal devices connected to different ones of said first switching means;
each of said first and second switching means including switching matrix means for selectively interconnecting inputs thereto and outputs therefrom by time slot interchange and controller means for controlling said switching matrix means in the form of a processor bus system comprising a multiconductor bus for carrying address, data and control information; a plurality of devices of different types connectable in parallel to said bus including a system processor, a memory circuit and maintenance means for detecting the failure of any of said devices; switch means for individually connecting said devices to said bus; and logic means responsive to a command from said maintenance means detecting the failure of one of said devices for selectively operating said switch means to disconnect said one device from said bus.

25. A digital information switching system according to claim 24 wherein said devices include redundant devices such as said system processor, said memory circuit and said maintenance means, which redundant devices are also selectively connectable to said bus by said switch means; said logic means including means responsive to said command from said maintenance means for operating said switch means to connect a redundant device of corresponding type to said bus upon failure of a device of that type while connected to said bus.

26. A digital information switching system according to claim 25 wherein each position on said bus at which a device may be connected is identified by a respective physical address comprising a combination of bits provided at the position by conductors in said bus, said combination of bits forming each physical address being received in the device as it is connected to said bus.

27. A digitial information switching system according to claim 26 wherein said maintenance means includes means for generating a command in the form of a device physical address and a command bit indicating connection or disconnection of the device, and means separate from said bus for carrying said command to all of said devices in common.

28. A digital information switching system according to claim 27 wherein said logic means is provided in each of said devices and includes in each device comparator means responsive to a physical address in a command from said maintenance means and the physical address received from said bus for generating a switching signal and gate means responsive to the command bit in said command for applying said switching signal to said switch means to selectively connect or disconnect the device from said bus.

29. A digital information switching system according to claim 28 further including modem means connected to said maintenance means for transmitting a fault signal to a remotely-located service station in response to detection of failure of a device connected to said bus.

* * * * *